United States Patent
Yang et al.

(10) Patent No.: US 12,237,776 B2
(45) Date of Patent: Feb. 25, 2025

(54) CONVERTER AND POWER ADAPTER

(71) Applicant: Huawei Digital Power Technologies Co., Ltd., Guangdong (CN)

(72) Inventors: Gun Yang, Dongguan (CN); Liang Wu, Dongguan (CN); Lei Wang, Shenzhen (CN)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 119 days.

(21) Appl. No.: 17/941,030

(22) Filed: Sep. 9, 2022

(65) Prior Publication Data

US 2023/0006561 A1 Jan. 5, 2023

Related U.S. Application Data

(63) Continuation of application No. PCT/CN2021/076509, filed on Feb. 10, 2021.

(51) Int. Cl.

| | |
|---|---|
| *H02M 1/34* | (2007.01) |
| *H02M 1/00* | (2006.01) |
| *H02M 1/08* | (2006.01) |
| *H02M 1/38* | (2007.01) |

(Continued)

(52) U.S. Cl.
CPC ..... *H02M 3/33571* (2021.05); *H02M 1/0025* (2021.05); *H02M 1/0048* (2021.05); *H02M 1/0058* (2021.05); *H02M 1/08* (2013.01); *H02M 1/342* (2021.05); *H02M 1/38* (2013.01); *H02M 3/01* (2021.05); *H02M 3/33507* (2013.01);
(Continued)

(58) Field of Classification Search
CPC ............. H02M 3/335; H02M 3/33571; H02M 3/33523; H02M 3/33507; H02M 3/33515; H02M 3/3353; H02M 3/01; H02M 1/08; H02M 1/34; H02M 1/342; H02M 1/38; H02M 1/385; H02M 1/0058; H02M 1/0025; H02M 1/0048; H02M 1/344
See application file for complete search history.

(56) References Cited

U.S. PATENT DOCUMENTS

| | | |
|---|---|---|
| 10,139,846 B2 | 11/2018 | Motsenbocker |
| 2018/0294734 A1* | 10/2018 | Song ................ H02M 3/33592 |
| 2019/0058450 A1 | 2/2019 | Jun et al. |

(Continued)

FOREIGN PATENT DOCUMENTS

| | | | |
|---|---|---|---|
| CN | 104300795 A * | 1/2015 | ........ H02M 3/33523 |
| CN | 106505865 A | 3/2017 | |

(Continued)

*Primary Examiner* — Thienvu V Tran
*Assistant Examiner* — Shahzeb K Ahmad

(57) ABSTRACT

This application discloses a converter and a power adapter, to reduce an energy loss of the power adapter. The converter includes a direct current power supply, a main power transistor, an auxiliary power transistor, a first capacitor, a transformer, and a control circuit. The first capacitor and the transformer are connected in series to form a series circuit. The series circuit is connected to a first terminal and a second terminal of the auxiliary power transistor in parallel. The control circuit is configured to: when the main power transistor is in a cutoff state and a target voltage reaches a target valley voltage, control the main power transistor to be conducted. The target voltage is a voltage between the first terminal of the main power transistor and the ground.

19 Claims, 11 Drawing Sheets

(51) Int. Cl.
*H02M 3/00* (2006.01)
*H02M 3/335* (2006.01)
(52) U.S. Cl.
CPC .... *H02M 3/33515* (2013.01); *H02M 3/33523* (2013.01)

(56) References Cited

U.S. PATENT DOCUMENTS

| | | | | |
|---|---|---|---|---|
| 2020/0091826 A1* | 3/2020 | Yang | ................. | H02M 3/33515 |
| 2021/0058002 A1* | 2/2021 | Wong | ................. | H02M 3/33569 |
| 2021/0194378 A1* | 6/2021 | Tian | ....................... | H02M 1/083 |
| 2022/0029545 A1* | 1/2022 | Duan | ....................... | H02M 3/33573 |
| 2022/0385197 A1* | 12/2022 | Zhang | ............... | H02M 3/33576 |

FOREIGN PATENT DOCUMENTS

| | | | |
|---|---|---|---|
| CN | 107896062 | A | 4/2018 |
| CN | 108155799 | A | 6/2018 |
| CN | 110601540 | A | 12/2019 |
| CN | 111953185 | A | 11/2020 |
| CN | 112271926 | A | 1/2021 |
| DE | 102018124581 | A1 | 4/2020 |
| JP | 2013046478 | A | 3/2013 |
| TW | I651608 | B | 2/2019 |
| WO | 2011100835 | A1 | 8/2011 |
| WO | 2020207356 | A1 | 10/2020 |

\* cited by examiner ial Appli-
CONVERTER AND POWER ADAPTER

CROSS-REFERENCE TO RELATED APPLICATIONS

This application is a continuation of International Application No. PCT/CN2021/076509, filed on Feb. 10, 2021, the disclosure of which is hereby incorporated by reference in its entirety.

TECHNICAL FIELD

This application relates to the field of power supply technologies, and specifically, to a converter and a power adapter.

BACKGROUND

With development of consumer electronics, various types of electronics emerge continuously. Most electronics are typically charged with a power adapter. There is an ever-increasing demand to reduce charging speed while also reducing the size of the power adapter. Therefore, power density of the power adapter needs to be increased. The power density is a magnitude of output power per unit volume.

If the power density of the power density increases, a current or a voltage increases, and consequently, more energy is used to generate heat. However, a natural heat dissipation capability of the power density per unit volume is limited. To meet a heat dissipation requirement, how to reduce an energy loss of the power density becomes an urgent problem to be solved.

SUMMARY

Embodiments of this application provide a converter and a power adapter, to reduce an energy loss of the power adapter.

A first aspect of this application provides a converter, including a direct current power supply, a main power transistor, an auxiliary power transistor, a first capacitor, a transformer, and a control circuit. The first capacitor and the transformer are connected in series to form a series circuit, the series circuit is connected to a first terminal and a second terminal of the auxiliary power transistor in parallel, a first terminal of the main power transistor is connected to the second terminal of the auxiliary power transistor, a second terminal of the main power transistor is connected to one of a positive electrode or a negative electrode of the direct current power supply, the first terminal of the auxiliary power transistor is connected to the other electrode of the direct current power supply, and the negative electrode is grounded. The control circuit is configured to: when the main power transistor is in a cutoff state and a target voltage reaches a target valley voltage, control the main power transistor to be conducted. The target voltage is a voltage between the first terminal of the main power transistor and the ground, and the target valley voltage is a voltage of at least one waveform valley in the target voltage when the converter operates.

It should be noted that when the converter operates, the target voltage is in a form of a wave. In other words, the target valley voltage is a voltage of at least one waveform valley in an operating waveform of the target voltage.

In the first aspect, the converter is applied to a power adapter, or may be applied to a vehicle-mounted power supply, or another product related to direct current-direct current switching control. The direct current power supply is configured to supply a direct current voltage to another electronic component in the converter. The main power transistor and the auxiliary power transistor each are a switching transistor, for example, may be a metal-oxide-semiconductor (metal oxide semiconductor, MOS) field-effect transistor. The first terminal of the auxiliary power transistor and the first terminal of the main power transistor each may be a source (source, S) or a drain (drain, D). If the first terminal is a source, the second terminal is a drain; and if the first terminal is a drain, the second terminal is a source. The direct current power supply includes a positive electrode and a negative electrode. The positive electrode is similar to a positive electrode of a power supply, and the negative electrode is similar to a negative electrode of the power supply. If one electrode is a positive electrode, the other electrode is a negative electrode; or if one electrode is a negative electrode, the other electrode is a positive electrode. In this converter, a source of the main power transistor may be connected to the negative electrode, or a source of the auxiliary power transistor may be connected to the negative electrode. A function of the first capacitor is to resonate with an inductor in the transformer and parasitic capacitors of the main power transistor and the auxiliary power transistor after the auxiliary power transistor is cut off.

In this application, in an operating process of the converter, the main power transistor and the auxiliary power transistor are not simultaneously conducted, but may be simultaneously cut off. There is a different path in the converter when each the main power transistor and the auxiliary power transistor is conducted, to control voltage output of the transformer. The voltage between the first terminal of the main power transistor and the ground is referred to as a "target voltage" in this application, and the target voltage changes with time. The operating waveform of the target voltage is a waveform including a voltage that changes with an operating time sequence of the converter, and the operating time sequence of the converter is a time sequence existing after the converter starts to operate. The target voltage changes continuously with operating time of the converter, and forms a waveform. The waveform includes a waveform valley. In this application, a voltage of the waveform valley in the waveform of the target voltage is referred to as a "valley voltage", and the "target valley voltage" in this application may be each of valley voltages in the waveform, or may be one or more of the valley voltages in the waveform. A plurality of valley voltages include two or more valley voltages.

In this application, because a conduction voltage of the main power transistor is directly proportional to an energy loss of the main power transistor, when the target voltage is the target valley voltage, the main power transistor is conducted, so that the main power transistor operates. In this case, the main power transistor has a smallest energy loss. It can be learned that the converter provided in the first aspect can be used to reduce the energy loss of the main power transistor, to reduce an energy loss of each of the converter and the power adapter.

In a possible implementation of the first aspect, the control circuit is specifically configured to: detect the target voltage when the main power transistor is in the cutoff state; determine, based on a preset policy, whether the target voltage reaches the target valley voltage; if the target voltage reaches the target valley voltage, control the main power transistor to be conducted; and after the main power transistor is cut off and a dead time period passes, control the auxiliary power transistor to be conducted. The dead time period is a time period in which the main power transistor is cut off and the auxiliary power transistor is not conducted.

In this possible implementation, the target voltage may be detected in a plurality of manners. The control circuit may be directly connected to the first terminal of the main power transistor and grounded, to measure the target voltage. Alternatively, the target voltage may be detected indirectly. For example, the target voltage may be detected by using the transformer. There may also be a plurality of preset policies, provided that it can be determined that the target voltage reaches the target valley voltage. A specific determining manner is not limited. For example, in a determining manner, the target voltage is equal to a preset valley voltage. Alternatively, whether the target voltage reaches the target valley voltage is determined by using some mathematical algorithms to calculate whether the target voltage is in the waveform valley of the waveform. In this possible implementation, a speed of detecting whether the target voltage reaches the target valley voltage can be increased, to flexibly control conduction of the main power transistor.

In a possible implementation of the first aspect, the control circuit is further configured to: determine a comparison result between the target voltage and a preset voltage threshold, and adjust conduction duration of the auxiliary power transistor based on the comparison result.

In this possible implementation, the preset voltage threshold may be an empirical value obtained based on a plurality of experimental results. In the converter, a preset voltage threshold used when the source of the main power transistor is connected to the negative electrode is different from a preset voltage threshold used when the source of the auxiliary power transistor is connected to the negative electrode. The comparison result between the target voltage and the preset voltage threshold may be that the target voltage is greater than the preset voltage threshold or that the target voltage is less than the preset voltage threshold. Adjusting the conduction duration of the auxiliary power transistor may be lengthening the conduction duration of the auxiliary power transistor, or may be shortening the conduction duration of the auxiliary power transistor. In this possible implementation, the conduction duration of the auxiliary power transistor is adjusted, to change a magnitude of an excitation current in a negative direction in the transformer. The exciting current affects the target voltage of the main power transistor, to reduce the valley voltage in the waveform of the target voltage, so that the main power transistor can be conducted at a lower voltage, to further reduce the energy loss of the main power transistor.

In a possible implementation of the first aspect, the second terminal of the main power transistor is connected to the negative electrode, and the first terminal of the auxiliary power transistor is connected to the positive electrode. The control circuit is specifically configured to: lengthen next conduction duration of the auxiliary power transistor based on current conduction duration of the auxiliary power transistor when the comparison result indicates that the target voltage is greater than the preset voltage threshold; or shorten next conduction duration of the auxiliary power transistor based on current conduction duration of the auxiliary power transistor when the comparison result indicates that the target voltage is less than the preset voltage threshold.

In this possible implementation, the second terminal is a source, the first terminal is a drain, a drain of the main power transistor is connected to the source of the auxiliary power transistor, the source of the main power transistor is connected to the negative electrode, and a drain of the auxiliary power transistor is connected to the positive electrode. In such a connection structure, the preset voltage threshold is usually 0. If the preset voltage threshold is represented by $V_{th}$ and the target voltage is represented by $V_{dssw}$, the comparison result may be $V_{dssw} > V_{th}$, or $V_{dssw} < V_{th}$. If $V_{dssw} > V_{th}$, it indicates that the target voltage needs to be further reduced. In this case, the conduction duration of the auxiliary power transistor needs to be lengthened, to further increase the excitation current in the negative direction in the transformer, so that the target voltage is reduced accordingly. On the contrary, if $V_{dssw} < V_{th}$, it indicates that the target voltage needs to be increased. In other words, the excitation current in the negative direction in the transformer needs to be reduced, so that the conduction duration of the auxiliary power transistor is shortened, to increase the target voltage. Regardless of a specific comparison result, the target voltage can be close to the preset voltage threshold as much as possible through corresponding adjustment, so that the target voltage reaches the valley voltage as early as possible. In this way, the main power transistor can be conducted at a lower voltage, to further reduce the energy loss of the main power transistor.

In a possible implementation of the first aspect, the second terminal of the main power transistor is connected to the positive electrode, and the first terminal of the auxiliary power transistor is connected to the negative electrode. The control circuit is specifically configured to: shorten next conduction duration of the auxiliary power transistor based on current conduction duration of the auxiliary power transistor when the comparison result indicates that the target voltage is greater than the preset voltage threshold; or lengthen next conduction duration of the auxiliary power transistor based on current conduction duration of the auxiliary power transistor when the comparison result indicates that the target voltage is less than the preset voltage threshold.

In this possible implementation, the second terminal is a drain, the first terminal is a source, the source of the main power transistor is connected to a drain of the auxiliary power transistor, the source of the auxiliary power transistor is connected to the negative electrode, and a drain of the main power transistor is connected to the positive electrode. In such a connection structure, the preset voltage threshold is usually a voltage $V_{in}$ between two terminals of the direct current power supply. If the preset voltage threshold is represented by $V_{th}$ and the target voltage is represented by $V_{dssw}$, the comparison result may be $V_{dssw} > V_{th}$, or $V_{dssw} < V_{th}$. If $V_{dssw} < V_{th}$, it indicates that the target voltage needs to be increased. In this case, the excitation current in the negative direction needs to be increased, so that the target voltage increases accordingly. The exciting current can be increased only by lengthening the conduction duration of the auxiliary power transistor. Therefore, when $V_{dssw} < V_{th}$, the conduction duration of the auxiliary power transistor needs to be lengthened. On the contrary, if $V_{dssw} > V_{th}$, it indicates that the target voltage needs to be reduced. In this case, the excitation current in the negative direction needs to be reduced, so that the target voltage is reduced accordingly. The magnitude of the excitation current can be reduced only by shortening the conduction duration of the auxiliary power transistor. Therefore, when $V_{dssw} > V_{th}$, the conduction duration of the auxiliary power transistor needs to be shortened. Regardless of a specific comparison result, the target voltage can be close to the preset voltage threshold as much as possible through corresponding adjustment, so that the target voltage reaches the valley voltage as early as possible. In this way, the main power transistor can be conducted at a lower voltage, to further reduce the energy loss of the main power transistor.

In a possible implementation of the first aspect, the control circuit is configured to: repeatedly adjust the conduction duration of the auxiliary power transistor based on an adaptive policy, and adjust the target voltage to the preset voltage threshold when the target voltage reaches a first valley voltage in an operating waveform of the target voltage.

In this possible implementation, $V_{dssw}$ may be adjusted by repeatedly adjusting the conduction duration of the auxiliary power transistor, so that $V_{dssw}$ is gradually close to $V_{th}$. At the first valley voltage, $V_{dssw}=V_{th}$, and a subsequent valley voltage is reduced accordingly. In this way, it can be ensured that when the target voltage reaches the subsequent valley voltage, the main power transistor can be conducted at a lower voltage, to further reduce the energy loss of the main power transistor.

In a possible implementation of the first aspect, the control circuit is further configured to: detect an excitation current in the transformer when the excitation current in the transformer is discontinuous and the auxiliary power transistor is conducted; and when the excitation current is equal to 0, control the auxiliary power transistor to be cut off.

In this possible implementation, when the excitation current is equal to 0, the auxiliary power transistor is cut off, to reduce oscillation of the target voltage, so that noise in the converter can be reduced.

In a possible implementation of the first aspect, in the operating time sequence of the converter, an operating waveform of the excitation current in the transformer includes at least one of a continuous waveform or a discontinuous waveform. If the operating waveform of the excitation current is a continuous waveform when the target voltage reaches the first valley voltage, the control circuit controls, when the target voltage reaches the first valley voltage, the main power transistor to be conducted. If the operating waveform of the excitation current is a discontinuous waveform when the target voltage reaches the first valley voltage, the control circuit maintains the main power transistor in the cutoff state, and when the target voltage reaches an $m^{th}$ valley voltage, controls the main power transistor to be conducted, where m is an integer greater than 1.

In this possible implementation, if the operating waveform of the excitation current is a continuous waveform when the target voltage reaches the first valley voltage, it indicates that the transformer still outputs the excitation current. In this case, when the target voltage reaches the first valley voltage, the control circuit may control the main power transistor to be conducted. If the operating waveform of the excitation current is a discontinuous waveform, the main power transistor is maintained in the cutoff state at the first valley voltage. In other words, the main power transistor is not conducted, and the main power transistor is conducted at each valley voltage starting from the second valley voltage.

In a possible implementation of the first aspect, the control circuit includes a detection circuit, a power transistor control circuit, a first drive circuit, and a second drive circuit. The power transistor control circuit is separately connected to the detection circuit, the first drive circuit, and the second drive circuit. The first drive circuit is connected to the main power transistor. The second drive circuit is connected to the auxiliary power transistor. The detection circuit is configured to detect the target voltage. The power transistor control circuit is configured to send a drive signal for the first drive circuit or the second drive circuit based on a detection result of the detection circuit. The first drive circuit is configured to drive, based on the drive signal, the main power transistor to be conducted or cut off; and the second drive circuit is configured to drive, based on the drive signal, the auxiliary power transistor to be conducted or cut off.

In this possible implementation, the control circuit may include a plurality of circuits. The detection circuit is configured to detect a target voltage between the first terminal and the second terminal of the main power transistor, the power transistor control circuit may generate the drive signal based on the detection result of the detection circuit, the first drive circuit may drive the main power transistor based on the drive signal, and the second drive circuit may drive the auxiliary power transistor based on the drive signal.

In a possible implementation of the first aspect, the converter further includes a second capacitor, and two terminals of the second capacitor are respectively connected to the positive electrode and the negative electrode of the direct current power supply.

In a possible implementation of the first aspect, the transformer includes a primary-side winding and a secondary-side winding, a dotted terminal of the primary-side winding is connected to the first capacitor, and a dotted terminal of the secondary-side winding is grounded.

A circuit structure described in this possible implementation may be applied to an asymmetrical half-bridge flyback topology.

In a possible implementation of the first aspect, the transformer includes a primary-side winding and a secondary-side winding, a dotted terminal of the primary-side winding is connected to the first capacitor, and a dotted terminal of the secondary-side winding is connected to a secondary-side synchronous rectifier.

A circuit structure described in this possible implementation may be applied to an asymmetrical half-bridge forward topology.

A second aspect of this application provides a converter, including a direct current power supply, a main power transistor, an auxiliary power transistor, a first capacitor, a transformer, and a control circuit. The first capacitor and the auxiliary power transistor are connected in series to form a series circuit, the series circuit is connected to two terminals of the transformer in parallel, a first terminal of the main power transistor is connected to a second terminal of the auxiliary power transistor, a second terminal of the main power transistor is connected to one of a positive electrode or a negative electrode of the direct current power supply, one terminal that is of the first capacitor and that is connected to the transformer is connected to the other electrode of the direct current power supply, and the negative electrode is grounded. The control circuit is configured to: when the main power transistor is in a cutoff state and a target voltage reaches a target valley voltage, control the main power transistor to be conducted. The target voltage is a voltage between the first terminal of the main power transistor and the ground, and the target valley voltage is a voltage of at least one waveform valley in the target voltage when the converter operates.

In the second aspect, only a connection relationship between the first capacitor, the transformer and the auxiliary power transistor is different. All other content may be understood with reference to corresponding content in the first aspect. Details are not described herein again.

In a possible implementation of the second aspect, the control circuit is specifically configured to: detect the target voltage when the main power transistor is in the cutoff state; determine, based on a preset policy, whether the target voltage reaches the target valley voltage; if the target voltage reaches the target valley voltage, control the main power transistor to be conducted; and after the main power transistor is cut off and a dead time period passes, control the auxiliary power transistor to be conducted. The dead time period is a time period in which the main power transistor is cut off and the auxiliary power transistor is not conducted.

In a possible implementation of the second aspect, the control circuit is further configured to: determine a comparison result between the target voltage and a preset voltage threshold, and adjust conduction duration of the auxiliary power transistor based on the comparison result.

In a possible implementation of the second aspect, the second terminal of the main power transistor is connected to the negative electrode, and a first terminal of the auxiliary power transistor is connected to the positive electrode. The control circuit is specifically configured to: lengthen next conduction duration of the auxiliary power transistor based on current conduction duration of the auxiliary power transistor when the comparison result indicates that the target voltage is greater than the preset voltage threshold; or shorten next conduction duration of the auxiliary power transistor based on current conduction duration of the auxiliary power transistor when the comparison result indicates that the target voltage is less than the preset voltage threshold.

In a possible implementation of the second aspect, the second terminal of the main power transistor is connected to the positive electrode, and the first terminal of the auxiliary power transistor is connected to the negative electrode. The control circuit is specifically configured to: shorten next conduction duration of the auxiliary power transistor based on current conduction duration of the auxiliary power transistor when the comparison result indicates that the target voltage is greater than the preset voltage threshold; or lengthen next conduction duration of the auxiliary power transistor based on current conduction duration of the auxiliary power transistor when the comparison result indicates that the target voltage is less than the preset voltage threshold.

In a possible implementation of the second aspect, the control circuit is configured to: repeatedly adjust the conduction duration of the auxiliary power transistor based on an adaptive policy, and adjust the target voltage to the preset voltage threshold when the target voltage reaches a first valley voltage in an operating waveform of the target voltage.

In a possible implementation of the second aspect, the control circuit is further configured to: detect an excitation current in the transformer when the excitation current in the transformer is discontinuous and the auxiliary power transistor is conducted; and when the excitation current is equal to 0, control the auxiliary power transistor to be cut off.

In a possible implementation of the second aspect, in an operating time sequence of the converter, an operating waveform of the excitation current in the transformer includes at least one of a continuous waveform or a discontinuous waveform. If the operating waveform of the excitation current is a continuous waveform when the target voltage reaches the first valley voltage, the control circuit controls, when the target voltage reaches the first valley voltage, the main power transistor to be conducted. If the operating waveform of the excitation current is a discontinuous waveform when the target voltage reaches the first valley voltage, the control circuit maintains the main power transistor in the cutoff state, and when the target voltage reaches an $m^{th}$ valley voltage, controls the main power transistor to be conducted, where m is an integer greater than 1.

In a possible implementation of the second aspect, the control circuit includes a detection circuit, a power transistor control circuit, a first drive circuit, and a second drive circuit. The power transistor control circuit is separately connected to the detection circuit, the first drive circuit, and the second drive circuit. The first drive circuit is connected to the main power transistor. The second drive circuit is connected to the auxiliary power transistor. The detection circuit is configured to detect the target voltage. The power transistor control circuit is configured to send a drive signal for the first drive circuit or the second drive circuit based on a detection result of the detection circuit. The first drive circuit is configured to drive, based on the drive signal, the main power transistor to be conducted or cut off; and the second drive circuit is configured to drive, based on the drive signal, the auxiliary power transistor to be conducted or cut off.

Any possible implementation of the second aspect may be understood with reference to a corresponding possible implementation in the first aspect. Details are not described herein.

In a possible implementation of the second aspect, the converter further includes a second capacitor, and two terminals of the second capacitor are respectively connected to the positive electrode and the negative electrode of the direct current power supply.

In a possible implementation of the second aspect, the transformer includes a primary-side winding and a secondary-side winding, a dotted terminal of the primary-side winding is connected to the positive electrode or the first terminal of the main power transistor, and a dotted terminal of the secondary-side winding is grounded.

A circuit structure described in this possible implementation may be applied to an active clamp flyback topology.

A third aspect of this application provides a power adapter, including the converter described in the first aspect or any possible implementation of the first aspect, an alternating current-direct current conversion circuit, and a filter circuit. The filter circuit is separately connected to the alternating current-direct current conversion circuit and the converter. The alternating current-direct current conversion circuit is configured to convert an alternating current in a power grid into a direct current. The converter is configured to supply a direct current voltage to a load. The filter circuit is configured to filter out noise in the alternating current-direct current conversion circuit and the converter.

A fourth aspect of this application provides a power adapter, including the converter described in the second aspect or any possible implementation of the second aspect, an alternating current-direct current conversion circuit, and a filter circuit. The filter circuit is separately connected to the alternating current-direct current conversion circuit and the converter. The alternating current-direct current conversion circuit is configured to convert an alternating current in a power grid into a direct current. The converter is configured to supply a direct current voltage to a load. The filter circuit is configured to filter out noise in the alternating current-direct current conversion circuit and the converter.

In this application, the power adapter may be a power adapter of various terminal devices such as a mobile phone, a notebook computer, a tablet computer, an electronic wearable device, a vehicle-mounted device, and an electronic home device. The power adapter may have different structures and appearances, but the converter described in the first aspect or any possible implementation of the first aspect of this application may be used, or the converter described in the second aspect or any possible implementation of the second aspect of this application may be used.

In this application, in addition to the power adapter, the converter provided in the first aspect or any possible implementation of the first aspect or the converter provided in the second aspect or any possible implementation of the second aspect may be applied to another product, for example, a vehicle-mounted power supply, a base station power supply, or another product related to direct current-direct current switching control.

BRIEF DESCRIPTION OF DRAWINGS

To describe the technical solutions in embodiments of this application more clearly, the following briefly describes the accompanying drawings for describing embodiments. It is clear that the accompanying drawings in the following description show merely some embodiments of this application, and persons of ordinary skill in the art may still derive other drawings from these accompanying drawings without creative efforts.

DESCRIPTION OF EMBODIMENTS

The following describes embodiments of this application with reference to accompanying drawings. It is clear that the described embodiments are merely a part rather than all of embodiments of this application. Persons of ordinary skill in the art may learn that, with development of technologies and emergence of new scenarios, technical solutions provided in embodiments of this application are also applicable to similar technical problems.

In the specification, claims, and the accompanying drawings of this application, terms "first", "second", and the like are intended to distinguish between similar objects but do not necessarily indicate a specific order or sequence. It should be understood that data termed in such a way is interchangeable in proper circumstances, so that embodiments described herein can be implemented in an order other than the order illustrated or described herein. Moreover, the terms "include", "comprise" and any other variants mean to cover non-exclusive inclusion. For example, a process, method, system, product, or device that includes a list of steps or units is not necessarily limited to those expressly listed steps or units, but may include other steps or units that are not expressly listed or inherent to the process, method, product, or device.

Embodiments of this application provide a converter and a power adapter, to reduce an energy loss of the power adapter. The following separately provides detailed descriptions.

With development of technologies, various types of electronics emerge continuously, and permeate every aspect of people's life. When being used, the electronics either need to be connected to mains or need to be pre-charged. Because voltages of many electronics do not match the mains, such terminal devices can be connected, only by using the power adapter, to the mains for charging.

Figure 1:
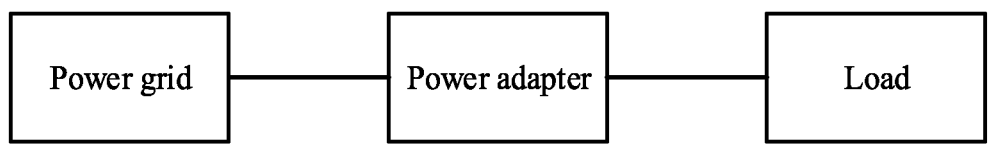
FIG. 1 is a schematic diagram of an application scenario of a power adapter.

As shown in FIG. 1, one terminal of a power adapter is connected to a power grid, and the other terminal is connected to a load. The power grid is usually a power supply network of mains used by residents, and the load may be various types of terminal devices, for example, a mobile phone, a tablet computer, a notebook computer, an electronic wearable device, electronic glasses, an electric toothbrush, a vacuum cleaner, and an electric bicycle.

Figure 2:
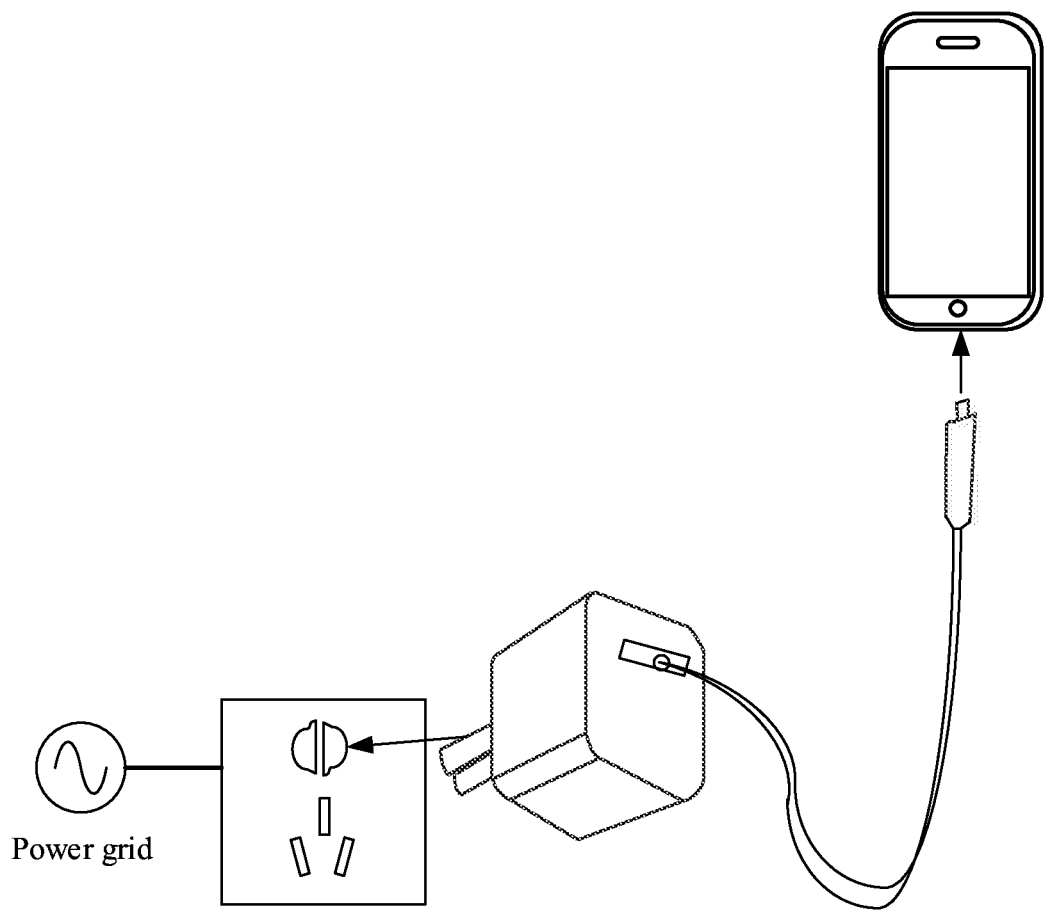
FIG. 2 is a schematic diagram of another application scenario of a power adapter.

A scenario in which the power adapter charges the load may be understood with reference to a scenario in which a mobile phone is charged in FIG. 2. As shown in FIG. 2, one terminal of the power adapter is connected to the power grid by using a socket, and the other terminal of the power adapter is connected to the mobile phone. In this way, a charging circuit from the power grid to the mobile phone can be conducted, to implement a process of charging the mobile phone.

The power adapter shown in FIG. 2 is only a possible form. Actually, there may be a plurality of types of power adapters, different types of terminal devices may have different power adapters, and a same type of terminal device may also have different power adapters. This is not limited in this application.

Figure 3:
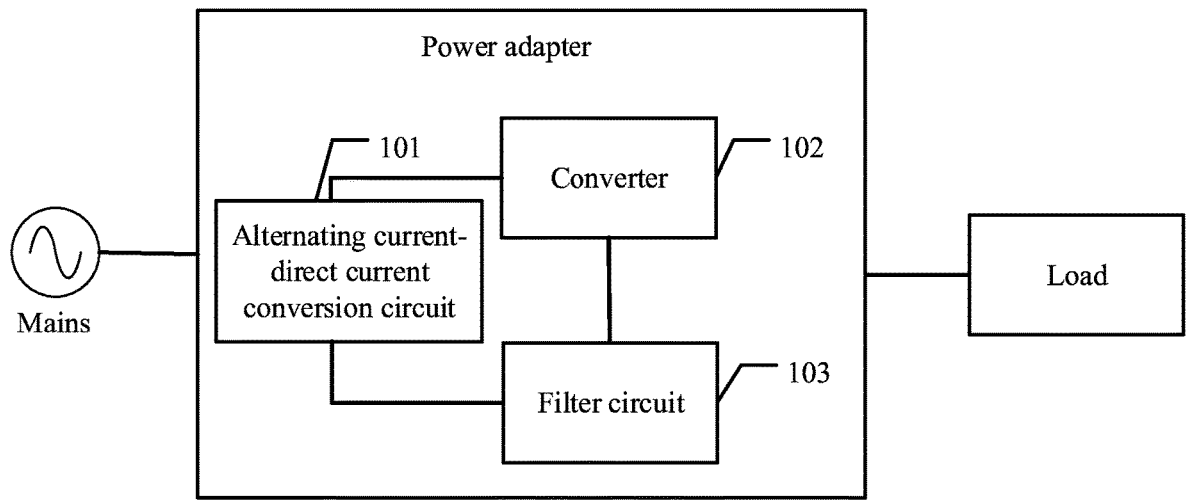
FIG. 3 is a schematic diagram of a structure of a power adapter according to an embodiment of this application.

The following describes an internal structure of the power adapter. FIG. 3 is a schematic diagram of a structure of a possible power adapter. As shown in FIG. 3, the power adapter includes an alternating current-direct current conversion circuit 101, a converter 102, and a filter circuit 103.

The filter circuit 103 is separately connected to the converter 102 and the alternating current-direct current conversion circuit 101. The alternating current-direct current conversion circuit 101 is configured to convert an alternating current in a power grid into a direct current, and the converter 102 is configured to supply a direct current voltage to a load. The filter circuit 103 is configured to filter out noise in the alternating current-direct current conversion circuit 101 and the converter 102.

The alternating current-direct current conversion circuit and the filter circuit are not further described in this application. The following describes, with reference to FIG. 4, the converter provided in an embodiment of this application.

Figure 4:
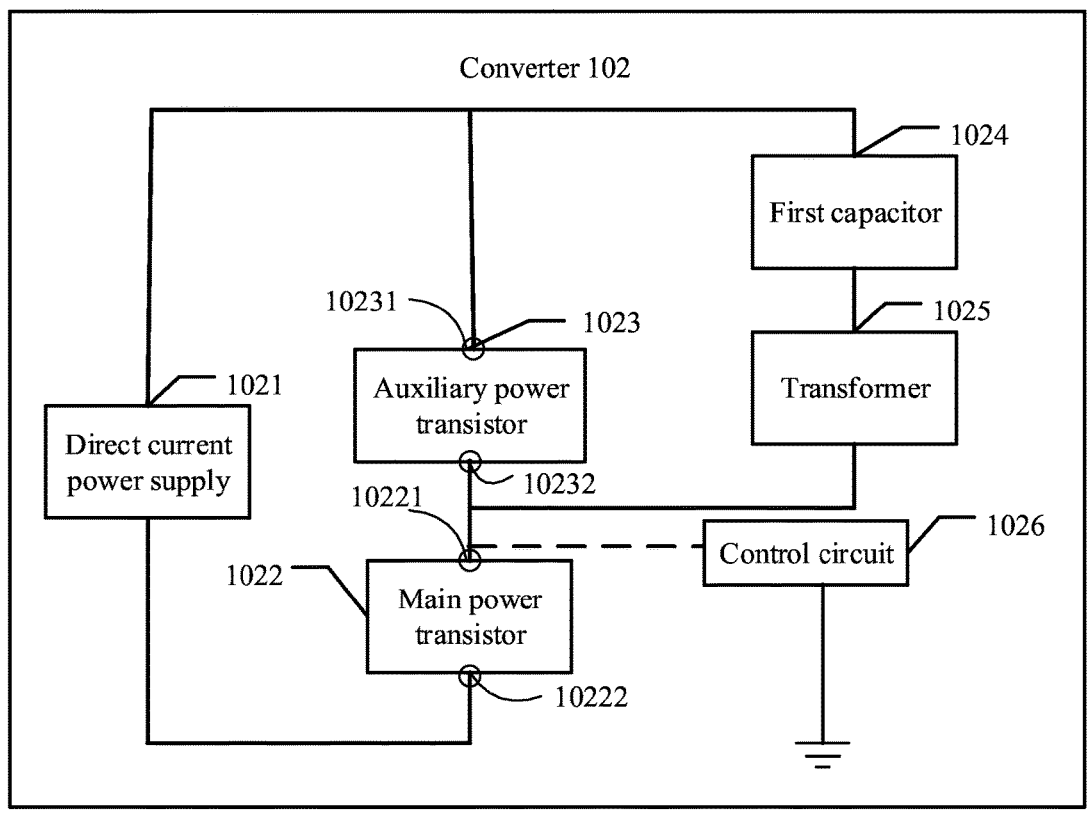
FIG. 4 is a schematic diagram of a structure of a converter according to an embodiment of this application.

FIG. 4 is a schematic diagram of a structure of a converter according to this embodiment of this application. As shown in FIG. 4, the converter includes a direct current power supply 1021, a main power transistor 1022, an auxiliary power transistor 1023, a first capacitor 1024, a transformer 1025, and a control circuit 1026. The first capacitor 1024 and the transformer 1025 are connected in series to form a series circuit, the series circuit is connected to a first terminal 10231 and a second terminal 10232 of the auxiliary power transistor 1023 in parallel, a first terminal 10221 of the main power transistor 1022 is connected to the second terminal 10232 of the auxiliary power transistor 1023, a second terminal 10222 of the main power transistor is connected to one of a positive electrode or a negative electrode of the direct current power supply 1021, the first terminal 10231 of the auxiliary power transistor 1023 is connected to the other electrode of the direct current power supply 1021, and the negative electrode of the direct current power supply 1021 is grounded.

The control circuit 1026 is configured to: when the main power transistor 1022 is in a cutoff state and a target voltage reaches a target valley voltage, control the main power transistor to be conducted. The target voltage is a voltage between the first terminal of the main power transistor and the ground, and the target valley voltage is a voltage of at least one waveform valley in the target voltage when the converter operates.

It should be noted that when the converter operates, the target voltage is in a form of a wave. In other words, the target valley voltage is a voltage of at least one waveform valley in an operating waveform of the target voltage.

The direct current power supply is configured to supply a direct current voltage to another electronic component in the converter. The main power transistor and the auxiliary power transistor each are a switching transistor, for example, may be a metal-oxide-semiconductor (metal oxide semiconductor, MOS) field-effect transistor. The first capacitor may be used to prevent a path including the direct current power supply, the main power transistor, the first capacitor, and the transformer from being short-circuited when the main power transistor is conducted. The first terminal of the auxiliary power transistor and the first terminal of the main power transistor each may be a source (source, S) or a drain (drain, D). If the first terminal is a source, the second terminal is a drain, and if the first terminal is a drain, the second terminal is a source. The direct current power supply includes a positive electrode and a negative electrode. The positive electrode is similar to a positive electrode of a power supply, and the negative electrode is similar to a negative electrode of the power supply. If one electrode is a positive electrode, the other electrode is a negative electrode; or if one electrode is a negative electrode, the other electrode is a positive electrode. In this converter, a source of the main power transistor may be connected to the negative electrode, or a source of the auxiliary power transistor may be connected to the negative electrode. A function of the first capacitor is to resonate with an inductor in the transformer and parasitic capacitors of the main power transistor and the auxiliary power transistor after the auxiliary power transistor is cut off.

In this application, in an operating process of the converter, the main power transistor and the auxiliary power transistor are not simultaneously conducted, but may be simultaneously cut off. There is a different path in the converter when each the main power transistor and the auxiliary power transistor is conducted, to control voltage output of the transformer. The voltage between the first terminal of the main power transistor and the ground is referred to as a "target voltage" in this application, and the target voltage changes with time. The operating waveform of the target voltage is a waveform including a voltage that changes with an operating time sequence of the converter, and the operating time sequence of the converter is a time sequence existing after the converter starts to operate. The target voltage changes continuously with operating time of the converter, and forms a waveform. The waveform includes a waveform valley. In this application, a voltage of the waveform valley in the waveform of the target voltage is referred to as a "valley voltage", and the "target valley voltage" in this application may be each of valley voltages in the waveform, or may be one or more of the valley voltages in the waveform. A plurality of valley voltages include two or more valley voltages.

Figure 5:
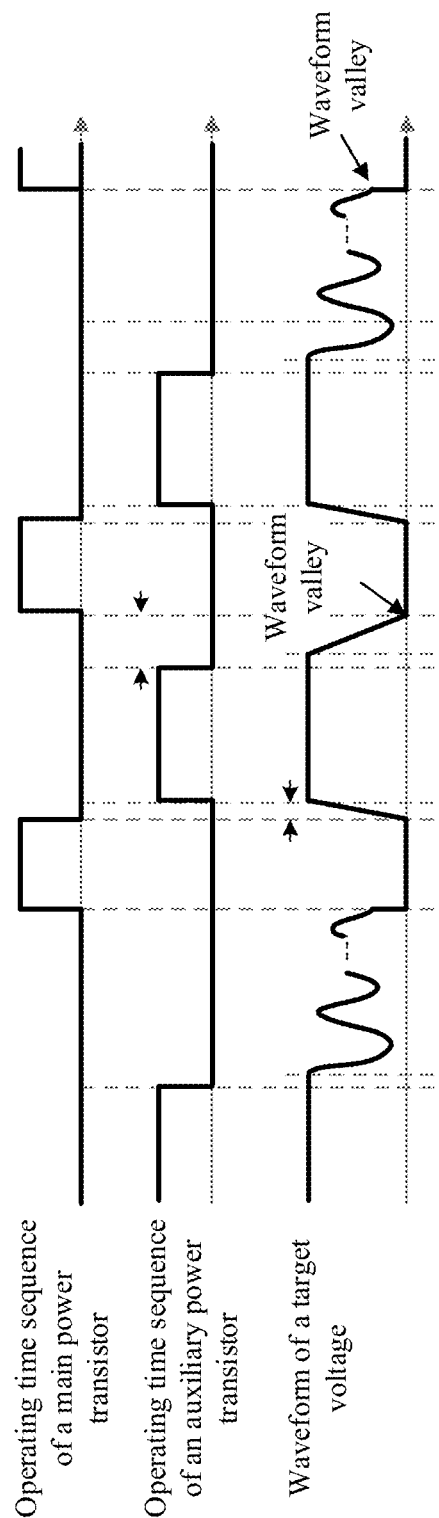
FIG. 5 is a diagram of a time sequence existing when a converter operates according to an embodiment of this application.

The operating time sequence of the converter and the operating waveform of the target voltage may be understood with reference to a diagram of a time sequence shown in FIG. 5. As shown in FIG. 5, in the operating time sequence, the main power transistor and the auxiliary power transistor are in a conducted state or a cutoff state in different time periods. Whether the main power transistor and the auxiliary power transistor are conducted or cut off may affect the target voltage, and the waveform of the target voltage changes accordingly. The waveform of the target voltage includes a waveform valley, and a valley bottom of the waveform of the target voltage shown in FIG. 5 is the waveform valley.

In this application, because a conduction voltage of the main power transistor is directly proportional to an energy loss of the main power transistor, when the target voltage is the target valley voltage, the main power transistor is conducted, so that the main power transistor operates. In this case, the main power transistor has a smallest energy loss. It can be learned that the converter provided in this application can be used to reduce the energy loss of the main power transistor, to reduce an energy loss of each of the converter and a power adapter.

The control circuit in FIG. 4 may be directly connected to the first terminal of the main power transistor and grounded, to measure the target voltage. Alternatively, the control circuit may detect the target voltage indirectly. For example, the target voltage may alternatively be detected by using the transformer. Regardless of a manner of detecting the target voltage, the control circuit in this application may determine, based on a preset policy, whether the target voltage reaches the target valley voltage. If the target voltage reaches the target valley voltage, the main power transistor is controlled to be conducted. There may also be a plurality of preset policies, provided that it can be determined that the target voltage reaches the target valley voltage. A specific determining manner is not limited. For example, in a determining manner, the target voltage is equal to a preset valley voltage. Alternatively, whether the target voltage reaches the target valley voltage is determined by using some mathematical algorithms to calculate whether the target voltage is in the waveform valley of the waveform. In this possible implementation, a speed of detecting whether the target voltage reaches the target valley voltage can be increased, to flexibly control conduction of the main power transistor.

In the foregoing described content, the control circuit may control the main power transistor to be conducted or cut off. In this application, the control circuit may further control the auxiliary power transistor to be conducted or cut off. The control circuit may determine a comparison result between the target voltage and a preset voltage threshold, and adjust conduction duration of the auxiliary power transistor based on the comparison result. The preset voltage threshold may be an empirical value obtained based on a plurality of experimental results. In the converter, a preset voltage threshold used when the source of the main power transistor is connected to the negative electrode of the direct current power supply is different from a preset voltage threshold used when the source of the auxiliary power transistor is connected to the negative electrode of the direct current power supply. The comparison result between the target voltage and the preset voltage threshold may be that the target voltage is greater than the preset voltage threshold or that the target voltage is less than the preset voltage threshold. Adjusting the conduction duration of the auxiliary power transistor may be lengthening the conduction duration of the auxiliary power transistor, or may be shortening the conduction duration of the auxiliary power transistor. The conduction duration of the auxiliary power transistor is adjusted, to change a magnitude of an excitation current in the transformer. The exciting current affects the target voltage of the main power transistor, to reduce the valley voltage in the waveform of the target voltage, so that the main power transistor can be conducted at a lower voltage, to further reduce the energy loss of the main power transistor.

Because there may be two connection relationships among the main power transistor, the auxiliary power transistor, and the direct current power supply, when the control circuit adjusts the conduction duration of the auxiliary power transistor, there are different execution processes for different connection relationships. With reference to diagrams of circuits, the following separately describes the two different connection relationships and execution processes of the control circuit in cases of different connection relationships.

1. The first terminal of the main power transistor and the first terminal of the auxiliary power transistor each are a drain, and the second terminal of the main power transistor and the second terminal of the auxiliary power transistor each are a source. A drain of the main power transistor is connected to the source of the auxiliary power transistor, the source of the main power transistor is connected to the negative electrode, and a drain of the auxiliary power transistor is connected to the positive electrode.

Figure 6:
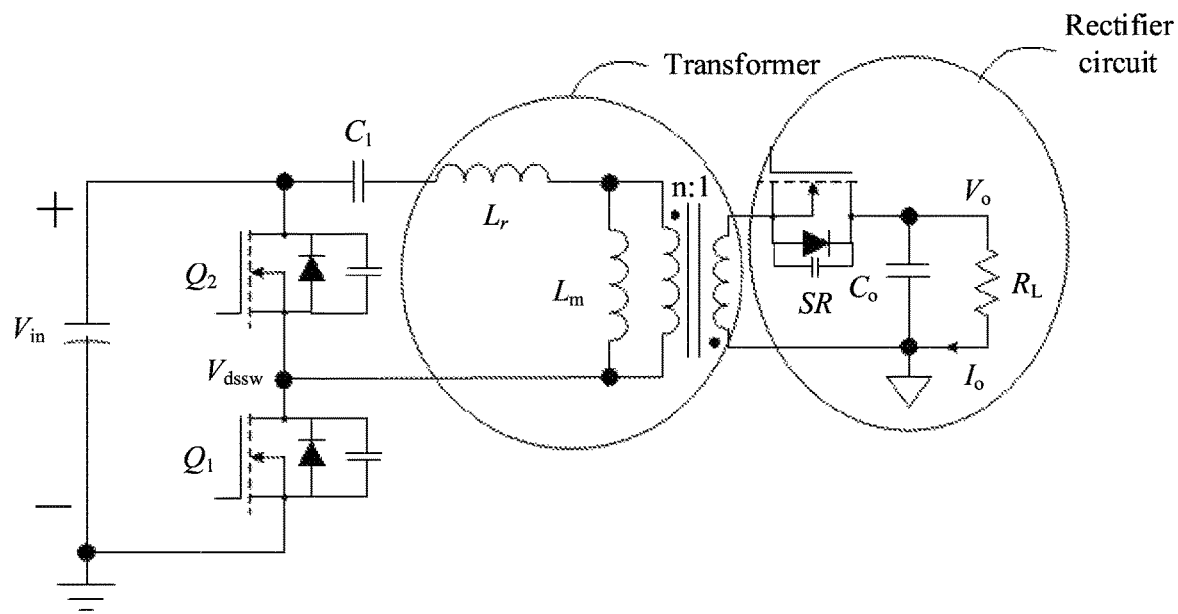
FIG. 6 is a diagram of a circuit of a converter according to an embodiment of this application.

A diagram of a circuit with such a connection relationship may be understood with reference to FIG. 6. As shown in FIG. 6, $Q_1$ is the main power transistor, $Q_2$ is the auxiliary power transistor, $C_1$ is the first capacitor, $V_{in}$ is output voltage of the direct current power supply, "+" is the positive electrode, "−" is the negative electrode, and $V_{dssw}$ is the target voltage. Although not shown in FIG. 6, actually, the control circuit may be connected to the source and a gate electrode of the main power transistor, to control the main power transistor to be conducted or cut off FIG. 6 further shows the transformer and a rectifier circuit. The rectifier circuit is connected to a secondary side of the transformer, and the rectifier circuit is configured to rectify a current output by the transformer.

In FIG. 6, a series circuit including the transformer and the first capacitor $C_1$ is connected to the source and the drain of the auxiliary power transistor $Q_2$ in parallel, the drain of the auxiliary power transistor $Q_2$ is connected to the positive electrode, the source of the main power transistor $Q_1$ is connected to the negative electrode, and the drain of the main power transistor $Q_1$ is connected to the source of the auxiliary power transistor $Q_2$. The transformer includes a primary-side winding and a secondary-side winding, a dotted terminal of the primary-side winding is connected to the first capacitor $C_1$, and a dotted terminal of the secondary-side winding is grounded.

In the connection relationship shown in FIG. 6, the control circuit determines the comparison result between the target voltage and the preset voltage threshold; and lengthens next conduction duration of the auxiliary power transistor based on current conduction duration of the auxiliary power transistor when the comparison result indicates that the target voltage is greater than the preset voltage threshold; or shortens next conduction duration of next auxiliary power transistor based on current conduction duration of the auxiliary power transistor when the comparison result indicates that the target voltage is less than the preset voltage threshold.

Figure 7:
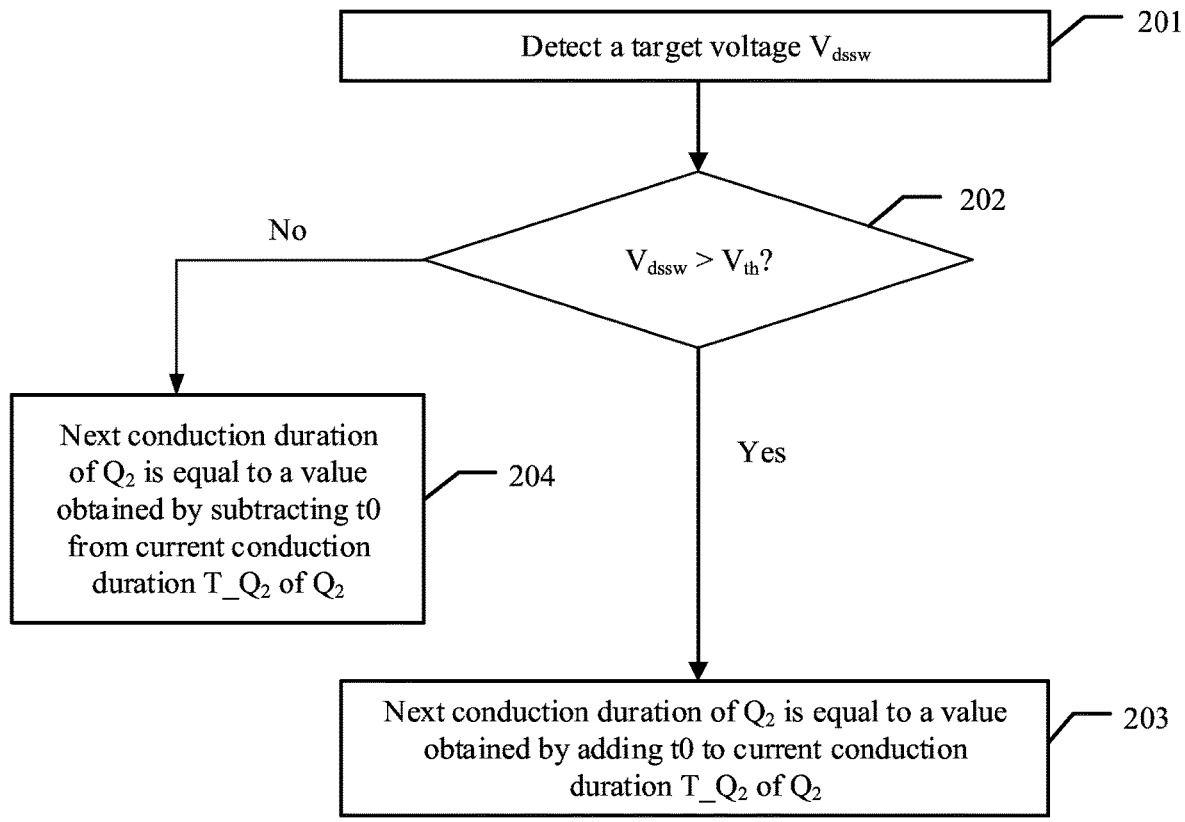
FIG. 7 is a schematic diagram of an adjustment process of conduction duration of an auxiliary power transistor according to an embodiment of this application.

If the preset voltage threshold is represented by $V_{th}$, the comparison result may be $V_{dssw}>V_{th}$, or $V_{dssw}<V_{th}$. In such a connection structure, the preset voltage threshold is usually 0. This process may be understood with reference to FIG. 7. As shown in FIG. 7, the process may include the following steps.

201: The control circuit detects the target voltage.

202: The control circuit determines whether $V_{dssw}>V_{th}$.

The control circuit may compare magnitudes of voltages in this application by using a comparator.

203: If $V_{dssw}>V_{th}$, the control circuit controls next conduction duration of the auxiliary power transistor $Q_2$ to be obtained by adding t0 to current conduction duration $T\_Q_2$ of the auxiliary power transistor $Q_2$.

In other words, if $V_{dssw}>V_{th}$, $T\_Q_2=T\_Q_2+t0$.

If $V_{dssw}>V_{th}$, it indicates that the target voltage needs to be further reduced. In this case, the conduction duration of the auxiliary power transistor needs to be lengthened, to further increase an excitation current in a negative direction in the transformer, so that the target voltage is reduced accordingly.

Figure 8:
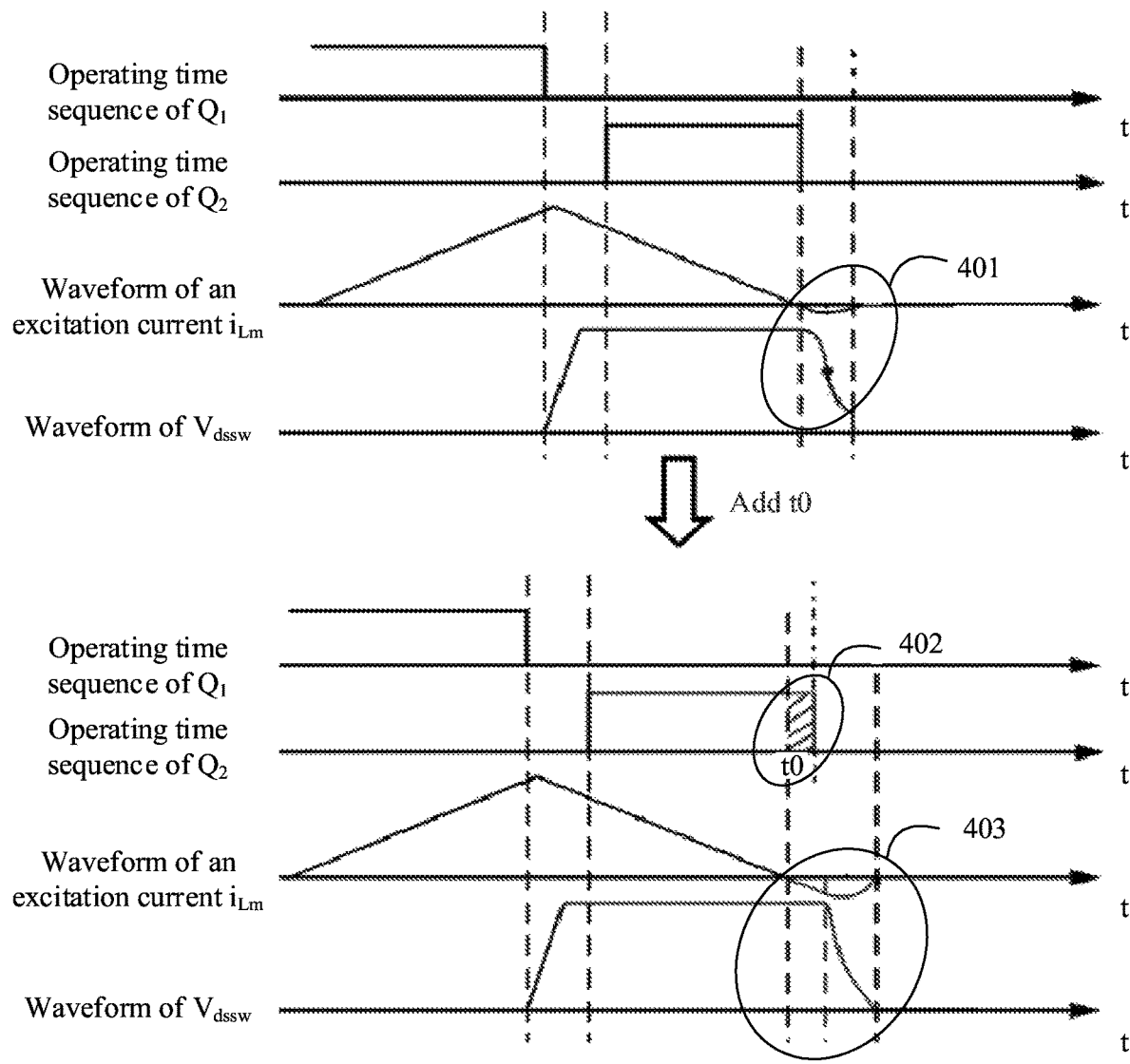
FIG. 8 is another diagram of a time sequence existing when a converter operates according to an embodiment of this application.

That the excitation current and the target voltage are changed by adding t0 may be understood with reference to FIG. 8.

FIG. 8 is a diagram of a time sequence that is of several parameters of a converter and that exists when t0 is added. After t0 is added as shown by a marked part 402 in FIG. 8, it can be learned from a comparison between a marked part 401 and a marked part 403 that, after t0 is added, an excitation current $i_{Lm}$ increases in the negative direction, and an amplitude at which the target voltage $V_{dssw}$ is reduced also increases. In this way, the main power transistor can be conducted at a lower voltage, to further reduce the energy loss of the main power transistor.

204: If $V_{dssw} \leq V_{th}$, the control circuit controls the next conduction duration of the auxiliary power transistor $Q_2$ to be obtained by subtracting t0 from the current conduction duration $T\_Q_2$ of the auxiliary power transistor $Q_2$.

In other words, if $V_{dssw}<V_{th}$, $T\_Q_2=T\_Q_2-t0$.

If $V_{dssw}<V_{th}$, it indicates that the target voltage needs to be increased. In other words, the excitation current in a negative direction in the transformer needs to be reduced, so that the conduction duration of the auxiliary power transistor is shortened, to increase the target voltage.

Figure 9:
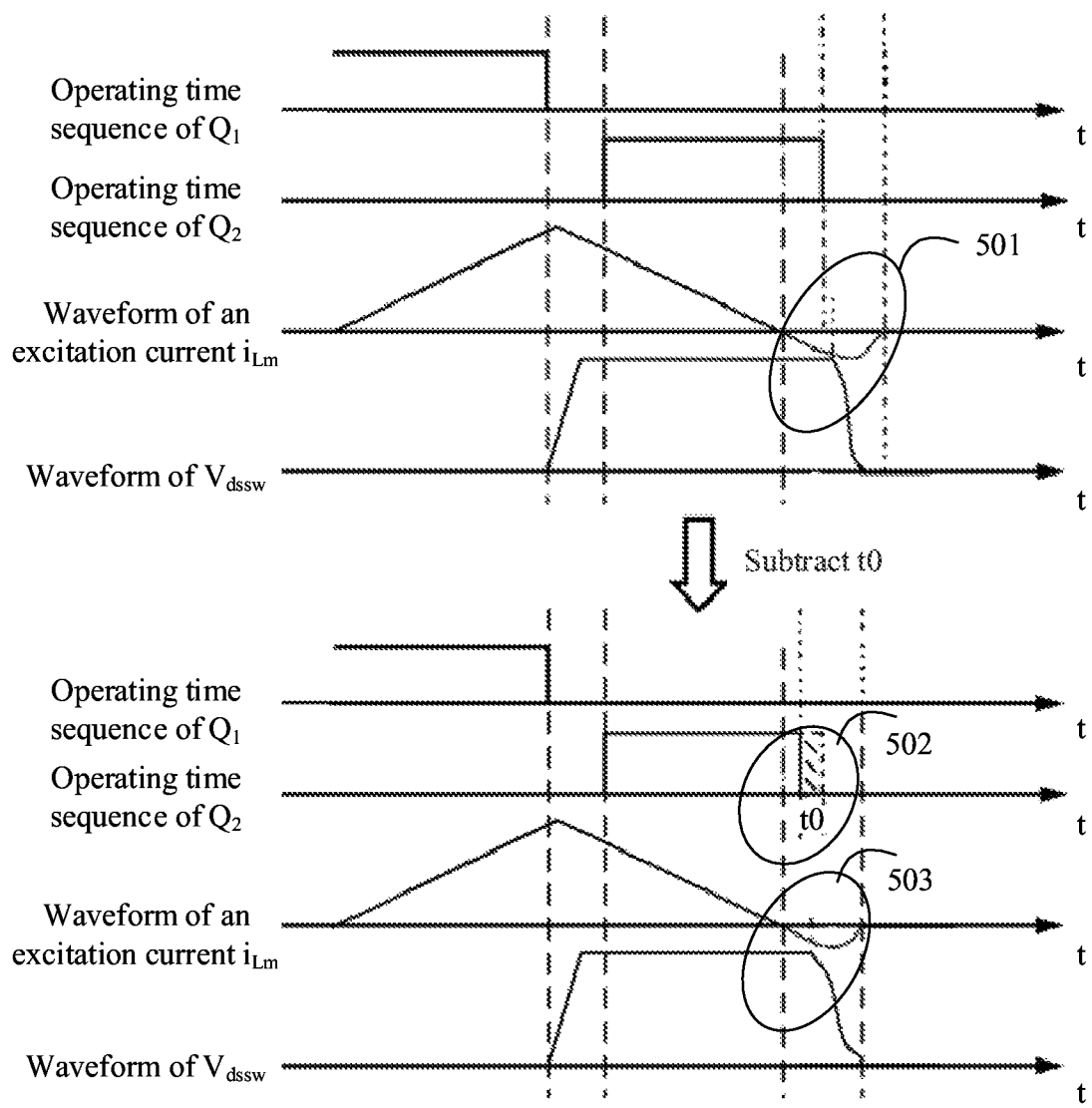
FIG. 9 is another diagram of a time sequence existing when a converter operates according to an embodiment of this application.

That the excitation current and the target voltage are changed by subtracting t0 may be understood with reference to FIG. 9.

FIG. 9 is a diagram of a time sequence that is of several parameters of a converter and that exists when t0 is subtracted. After t0 is subtracted as shown by a marked part 502 in FIG. 9, it can be learned from a comparison between a marked part 501 and a marked part 503 that, when t0 is subtracted, an amplitude at which the excitation current $i_{Lm}$ increases in the negative direction decreases, and an amplitude at which the target voltage $V_{dssw}$ is reduced also decreases.

In this way, regardless of a specific comparison result, the target voltage can be close to the preset voltage threshold as much as possible through corresponding adjustment, so that the target voltage reaches the valley voltage as early as possible. In this way, the main power transistor can be conducted at a lower voltage, to further reduce the energy loss of the main power transistor.

2. The first terminal of the main power transistor and the first terminal of the auxiliary power transistor each are a source, and the second terminal of the main power transistor and the second terminal of the auxiliary power transistor each are a drain. The source of the main power transistor is connected to a drain of the auxiliary power transistor, the source of the auxiliary power transistor is connected to the negative electrode of the direct current power supply, and a drain of the main power transistor is connected to the positive electrode of the direct current power supply.

Figure 10:
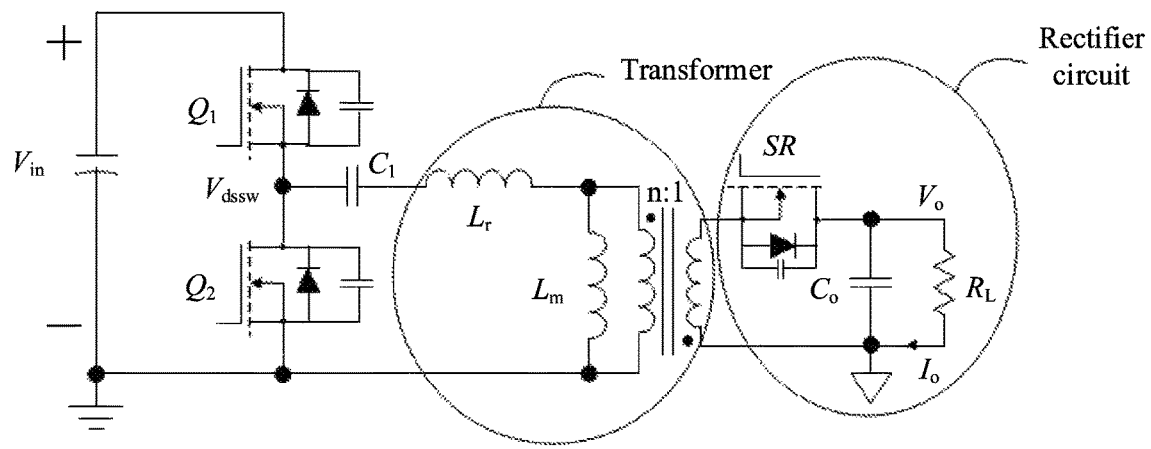
FIG. 10 is another diagram of a circuit of a converter according to an embodiment of this application.

A diagram of a circuit with such a connection relationship may be understood with reference to FIG. 10. As shown in FIG. 10, $Q_1$ is the main power transistor, $Q_2$ is the auxiliary power transistor, $C_1$ is the first capacitor, $V_{in}$ is output voltage of the direct current power supply, "+" is the positive electrode, "−" is the negative electrode, and $V_{dssw}$ is the target voltage. Although not shown in FIG. 10, actually, the control circuit may be connected to the source and a gate electrode of the main power transistor, to control the main power transistor to be conducted or cut off. FIG. 10 further shows the transformer and a rectifier circuit. The rectifier circuit is connected to a secondary side of the transformer, and the rectifier circuit is configured to rectify a current output by the transformer.

In FIG. 10, a series circuit including the transformer and the first capacitor $C_1$ is connected to a source and a drain of the auxiliary power transistor $Q_2$ in parallel, the source of the auxiliary power transistor $Q_2$ is connected to the positive electrode, the drain of the main power transistor $Q_1$ is connected to the negative electrode, and the source of the main power transistor $Q_1$ is connected to the drain of the auxiliary power transistor $Q_2$. The transformer includes a primary-side winding and a secondary-side winding, a dotted terminal of the primary-side winding is connected to the first capacitor $C_1$, and a dotted terminal of the secondary-side winding is grounded.

In the connection relationship shown in FIG. 10, the control circuit determines the comparison result between the target voltage and the preset voltage threshold; and shortens next conduction duration of the auxiliary power transistor based on current conduction duration of the auxiliary power transistor when the comparison result indicates that the target voltage is greater than the preset voltage threshold; or lengthens next conduction duration of next auxiliary power transistor based on current conduction duration of the auxiliary power transistor when the comparison result indicates that the target voltage is less than the preset voltage threshold.

Figure 11:
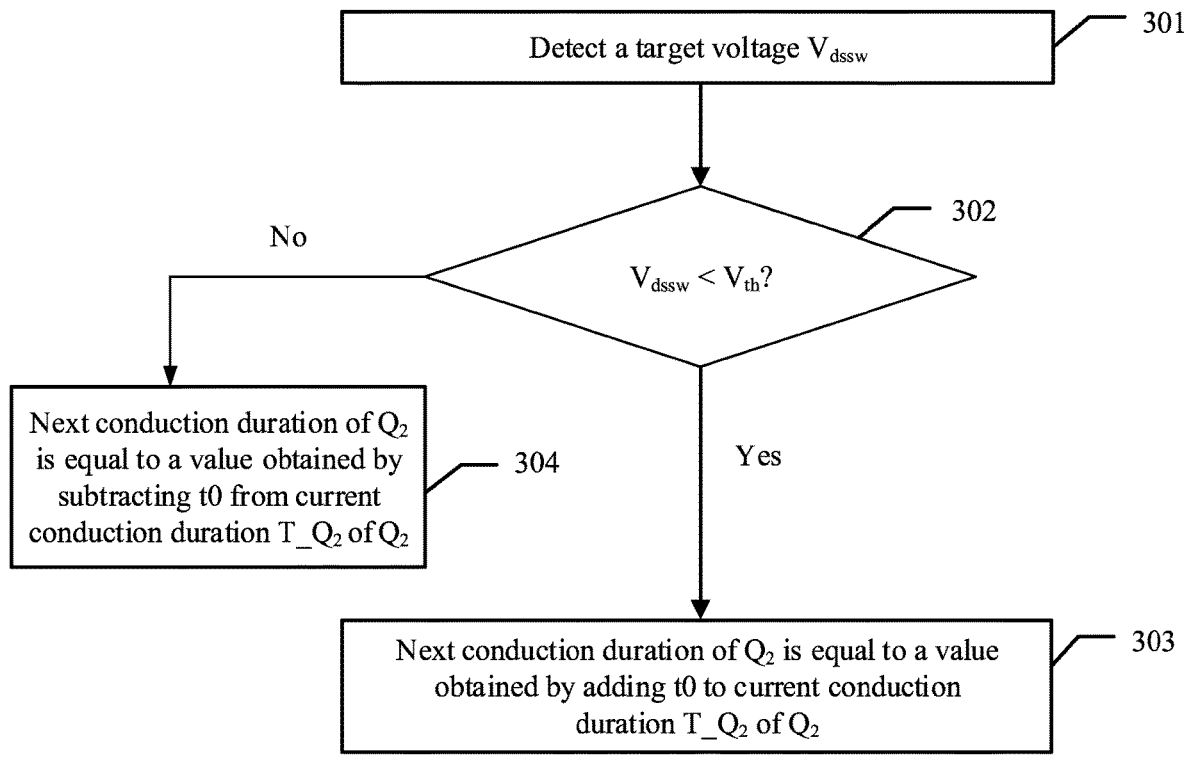
FIG. 11 is a schematic diagram of another adjustment process of conduction duration of an auxiliary power transistor according to an embodiment of this application.

If the preset voltage threshold is represented by $V_{th}$, the comparison result may be $V_{dssw}>V_{th}$, or $V_{dssw}<V_{th}$. In such a connection structure, the preset voltage threshold is usually a voltage $V_{in}$ between two terminals of the direct current power supply. This process may be understood with reference to FIG. 11. As shown in FIG. 11, the process may include the following steps.

301: The control circuit detects the target voltage.

302: The control circuit determines whether $V_{dssw}<V_{th}$.

303: If $V_{dssw}<V_{th}$, the control circuit controls next conduction duration of auxiliary power transistor $Q_2$ to be obtained by adding t0 to current conduction duration $T\_Q_2$ of the auxiliary power transistor $Q_2$.

In other words, if $V_{dssw}<V_{th}$, $T\_Q_2=T\_Q_2+t0$.

If $V_{dssw}<V_{th}$, it indicates that the target voltage needs to be increased. In this case, an excitation current in a negative direction needs to be increased, so that the target voltage increases accordingly. The exciting current can be increased only by lengthening the conduction duration of the auxiliary power transistor. Therefore, when $V_{dssw}<V_{th}$, the conduction duration of the auxiliary power transistor needs to be lengthened.

304: If $V_{dssw}\geq V_{th}$, the control circuit controls next conduction duration of the auxiliary power transistor $Q_2$ to be obtained by subtracting t0 from current conduction duration $T\_Q_2$ of the auxiliary power transistor $Q_2$.

In other words, if $V_{dssw}>V_{th}$, $T\_Q_2=T\_Q_2-t0$.

If $V_{dssw}>V_{th}$, it indicates that the target voltage needs to be reduced. In this case, the excitation current in the negative direction needs to be reduced, so that the target voltage is reduced accordingly. A magnitude of the excitation current can be reduced only by shortening the conduction duration of the auxiliary power transistor. Therefore, when $V_{dssw}>V_{th}$, the conduction duration of the auxiliary power transistor needs to be shortened.

In this way, regardless of a specific comparison result, the target voltage can be close to the preset voltage threshold as much as possible through corresponding adjustment, so that the target voltage reaches the valley voltage as early as possible. In this way, the main power transistor can be conducted at a lower voltage, to further reduce the energy loss of the main power transistor.

The control circuit may repeatedly perform the processes in FIG. 7 and FIG. 11 based on an adaptive policy. In other words, the control circuit repeatedly adjusts the conduction duration of the auxiliary power transistor based on the adaptive policy, and adjusts the target voltage to the preset voltage threshold when the target voltage reaches a first valley voltage in the operating waveform of the target voltage.

In this application, $V_{dssw}$ may be adjusted by repeatedly adjusting the conduction duration of the auxiliary power transistor, so that $V_{dssw}$ is gradually close to $V_{th}$. At the first valley voltage, $V_{dssw}=V_{th}$, and a subsequent valley voltage is reduced accordingly. In this way, it can be ensured that when the target voltage reaches the subsequent valley voltage, the main power transistor can be conducted at a lower voltage, to further reduce the energy loss of the main power transistor.

In addition, in this application, the control circuit is further configured to: detect the excitation current in the transformer when the excitation current in the transformer is discontinuous and the auxiliary power transistor is conducted; and when the excitation current is equal to 0, control the auxiliary power transistor to be cut off. When the excitation current is equal to 0, the auxiliary power transistor is cut off, to reduce oscillation of the target voltage, so that noise in the converter can be reduced.

In this application, the target valley voltage is a valley voltage in the operating waveform of the target voltage other than the first valley voltage. If the excitation current in the transformer is discontinuous when the target voltage reaches the first valley voltage, the control circuit maintains the main power transistor in the cutoff state. In other words, if the excitation current in the transformer is discontinuous when the target voltage reaches the first valley voltage, it indicates that a requirement of a load for the current is reduced, and the main power transistor cannot be conducted currently. If the main power transistor is conducted, the transformer continuously outputs the current, which is not conducive to protection for the load.

Figure 12:
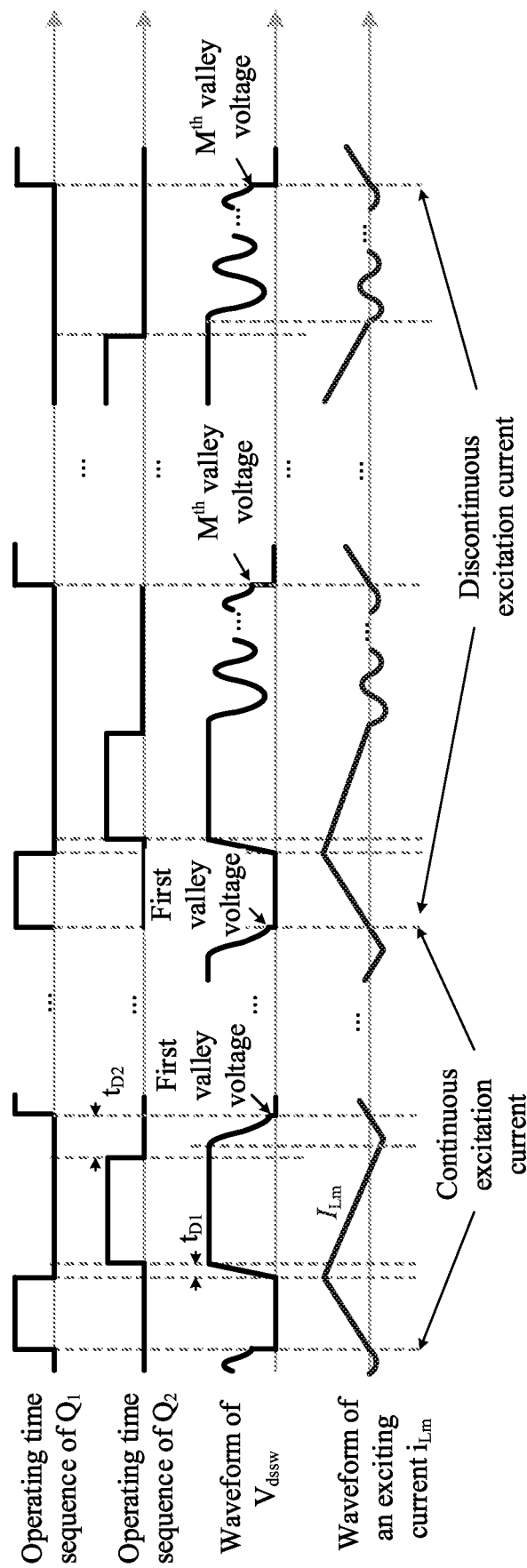
FIG. 12 is another diagram of a time sequence existing when a converter operates according to an embodiment of this application.

In this application, in the operating time sequence of the converter, an operating waveform of the excitation current in the transformer includes at least one of a continuous waveform or a discontinuous waveform. As shown in a diagram of a time sequence in FIG. 12, in this application, a time period in which the main power transistor is conducted once and the auxiliary power transistor is conducted once is one period, the continuous waveform may include j periods, the discontinuous waveform may include k periods, the continuous waveform including the j periods may be continuous, the discontinuous waveform including the k periods may be continuous, and at least one of j and k is an integer greater than or equal to 1. In this application, a valley voltage counting manner is not to perform continuous counting in an entire operating sequence of the converter, but to perform recounting in each period. In addition, both $t_{D1}$ and $t_{D2}$ in the figure mark dead time periods. The dead time period is a time period in which neither the main power transistor nor the auxiliary power transistor is conducted. A difference is that $t_{D1}$ represents a dead time period in which the main power transistor is cut off and the auxiliary power transistor is not conducted, and $t_{D2}$ indicates a dead time period from a time point at which the auxiliary power transistor is cut off to a time point at which the main power transistor is conducted. If the operating waveform of the excitation current is a continuous waveform when the target voltage reaches the first valley voltage, the control circuit controls, when the target voltage reaches the first valley voltage, the main power transistor to be conducted. As shown in FIG. 12, if the operating waveform of the excitation current is a continuous waveform when the target voltage reaches the first valley voltage, the control circuit may control $Q_1$ to be conducted, and if the operating waveform of the excitation current is a discontinuous waveform when the target voltage reaches the first valley voltage, the control circuit controls, when the target voltage reaches an $m^{th}$ valley voltage, the main power transistor to be conducted, where m is an integer greater than 1. In other words, if the operating waveform of the excitation current is a discontinuous waveform when the target voltage reaches the first valley voltage, $Q_1$ is controlled to be conducted at the second valley voltage and a subsequent valley voltage.

Figure 13:
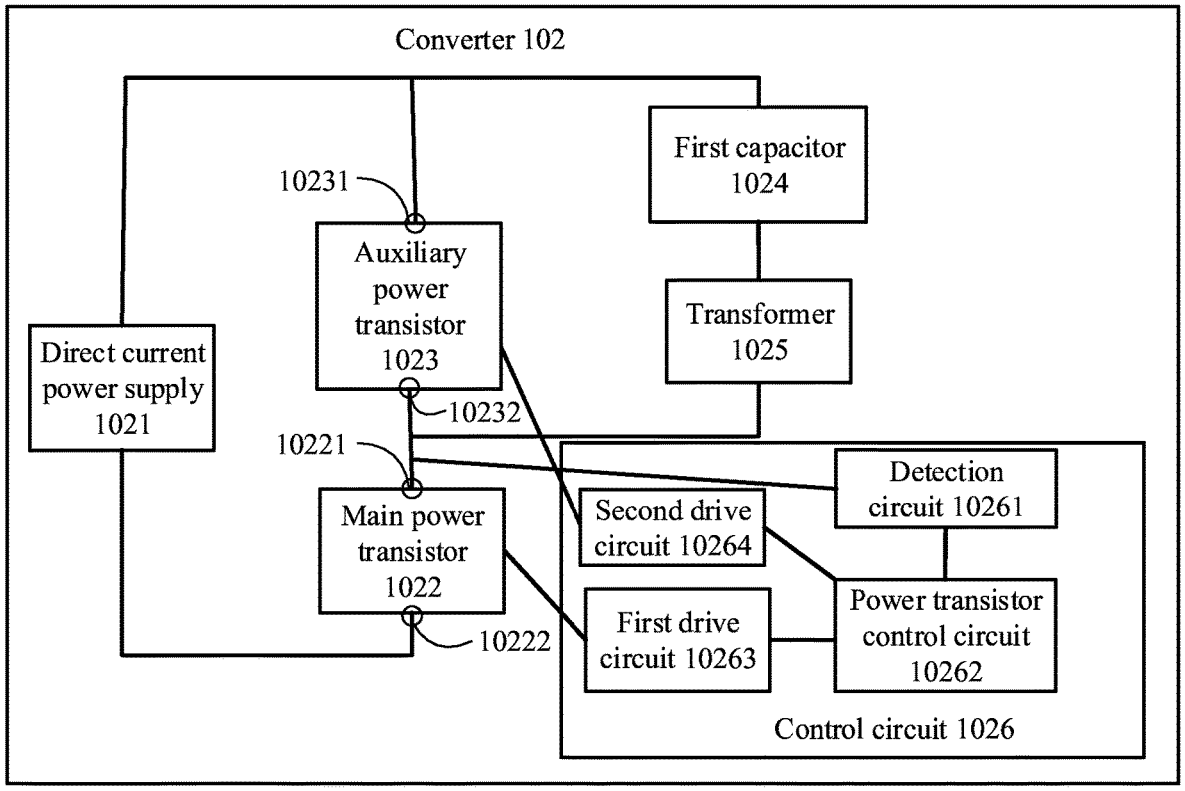
FIG. 13 is another schematic diagram of a structure of a converter according to an embodiment of this application.

In this application, as shown in FIG. 13, the control circuit includes a detection circuit 10261, a power transistor control circuit 10262, a first drive circuit 10263, and a second drive circuit 10264. The power transistor control circuit 10262 is separately connected to the detection circuit 10261, the first drive circuit 10263, and the second drive circuit 10264. The first drive circuit 10263 is connected to the main power transistor 1022. The second drive circuit 10264 is connected to the auxiliary power transistor 1023. The detection circuit 10261 is configured to detect the target voltage. The power transistor control circuit 10262 is configured to send a drive signal for the first drive circuit or the second drive circuit based on a detection result of the detection circuit. The first drive circuit 10263 is configured to drive, based on the drive signal, the main power transistor 1022 to be conducted or cut off; and the second drive circuit 10264 is configured to drive, based on the drive signal, the auxiliary power transistor 1023 to be conducted or cut off.

The diagrams of circuits shown in FIG. 6 and FIG. 10 may further include a second capacitor, and two terminals of the second capacitor are respectively connected to the positive electrode and the negative electrode of the direct current power supply.

The circuits shown in FIG. 6 and FIG. 10 may be applied to an asymmetrical half-bridge flyback topology.

Figure 14:
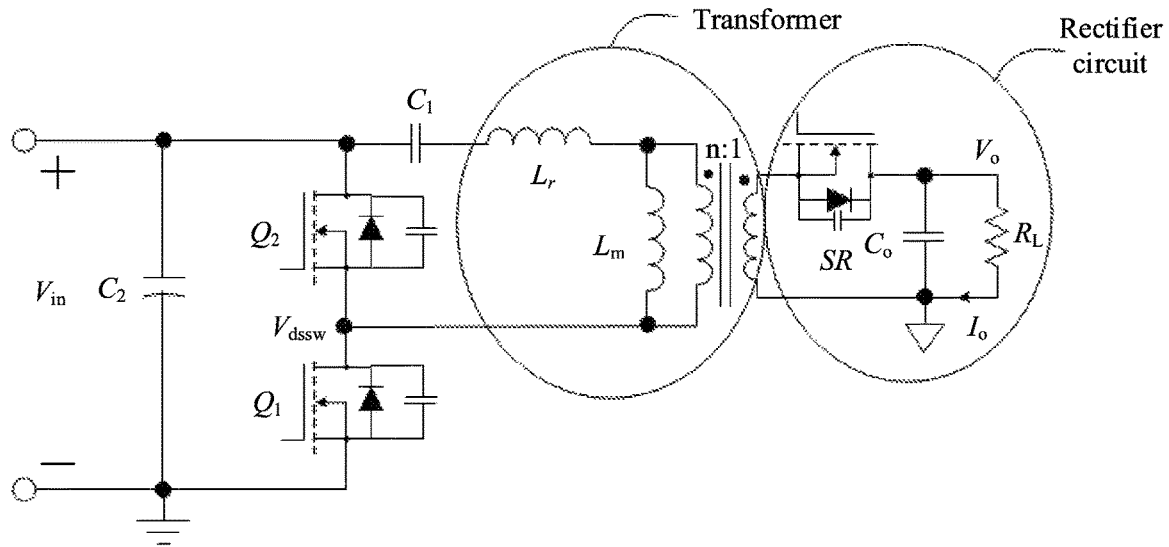
FIG. 14 is another diagram of a circuit of a converter according to an embodiment of this application.
Figure 15:
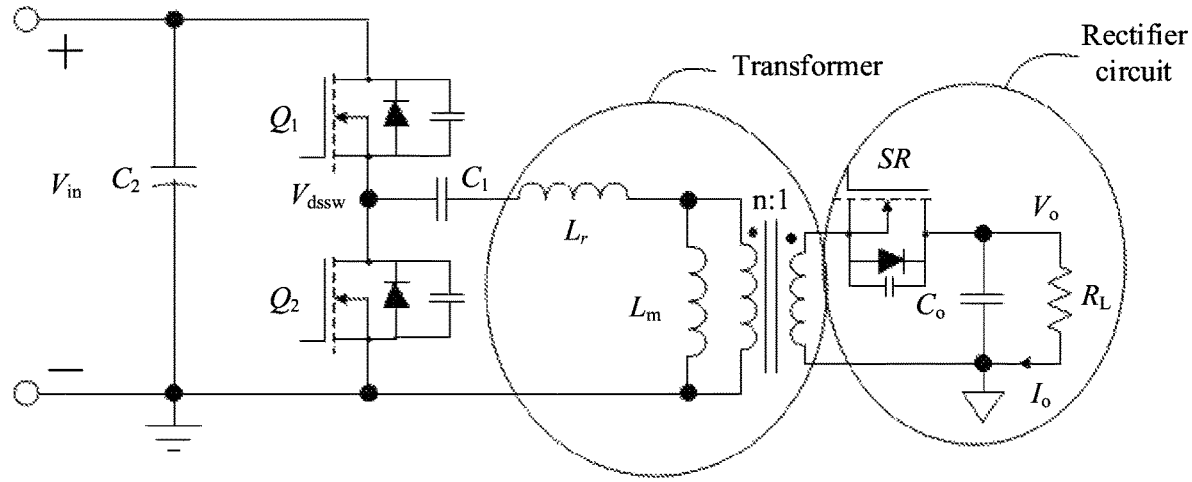
FIG. 15 is another diagram of a circuit of a converter according to an embodiment of this application.

In addition to the asymmetrical half-bridge flyback topology in FIG. 6 or FIG. 10, an asymmetrical half-bridge forward topology in FIG. 14 and FIG. 15 may be applied to the converter in the foregoing solution provided in this application.

In FIG. 14, a second capacitor $C_2$ is clearly marked. In addition, a difference between FIG. 14 and FIG. 6 is that the transformer includes a primary-side winding and a secondary-side winding, a dotted terminal of the primary-side winding is connected to the first capacitor $C_1$, and a dotted terminal of the secondary-side winding is connected to a synchronous rectifier SR in a rectifier circuit. Other parts may be understood with reference to content in FIG. 6.

In FIG. 15, the second capacitor $C_2$ is clearly marked. In addition, a difference between FIG. 15 and FIG. 10 is that the transformer includes a primary-side winding and a secondary-side winding, a dotted terminal of the primary-side winding is connected to the first capacitor $C_1$, and a dotted terminal of the secondary-side winding is connected to a secondary-side synchronous rectifier.

Figure 16:
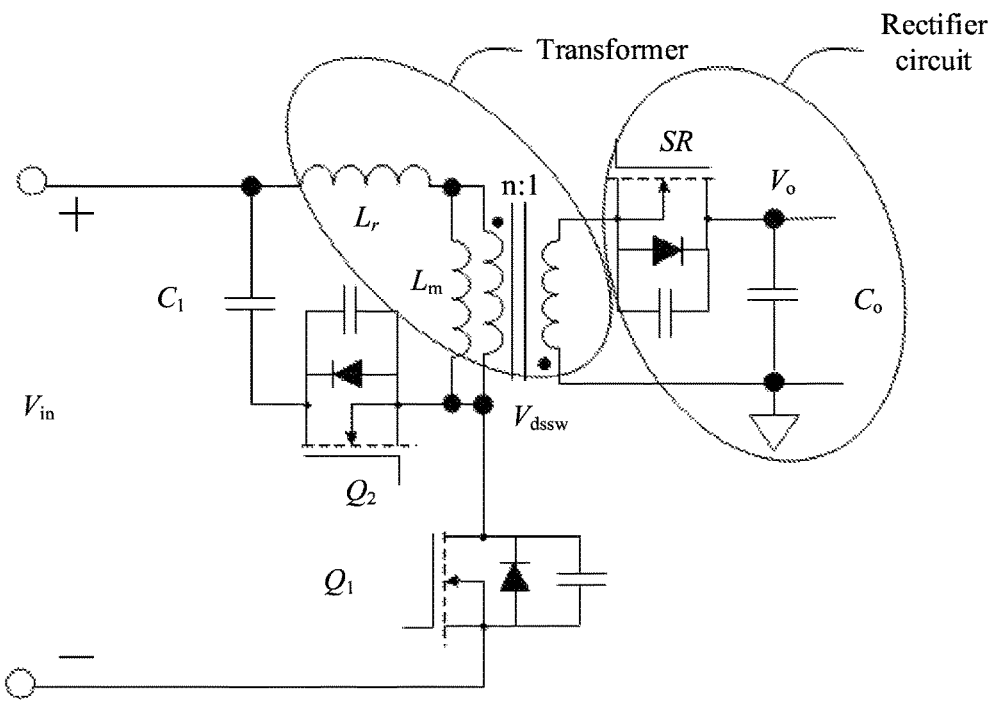
FIG. 16 is another diagram of a circuit of a converter according to an embodiment of this application.
Figure 17:
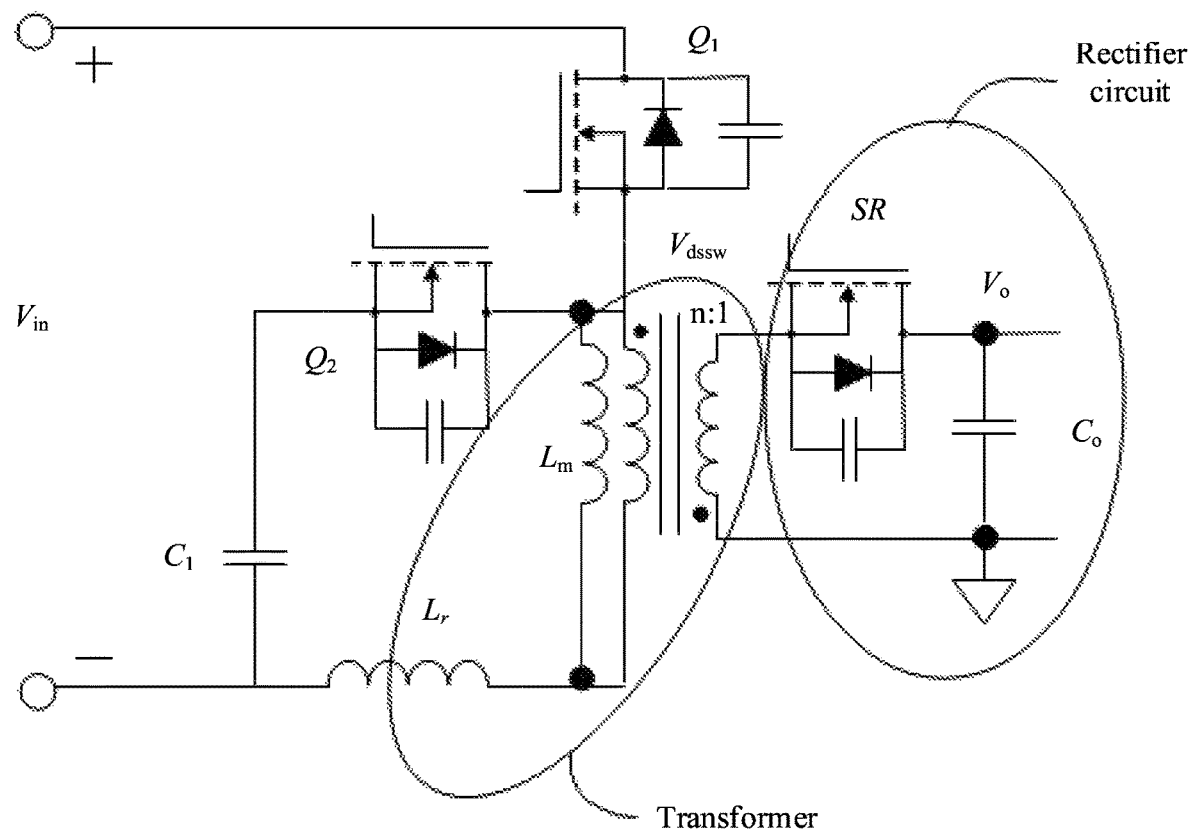
FIG. 17 is another diagram of a circuit of a converter according to an embodiment of this application.

An active clamp flyback topology shown in FIG. 16 and FIG. 17 may also be used for the converter in the foregoing solution provided in this application. As shown in FIG. 16, a structure shown in FIG. 16 is slightly different from the structure shown in FIG. 6. The series circuit formed after the auxiliary power transistor $Q_2$ and the first capacitor $C_1$ are connected in series is connected to the transformer in parallel, connection terminals of the first capacitor $C_1$ and the transformer are connected to the positive electrode, the source of the main power transistor $Q_1$ is connected to the negative electrode, and the drain of the main power transistor $Q_1$ is connected to the source of the auxiliary power transistor $Q_2$. The transformer includes a primary-side winding and a secondary-side winding, a dotted terminal of the primary-side winding is connected to the positive electrode, and a dotted terminal of the secondary-side winding is grounded. FIG. 16 further shows a rectifier circuit. The rectifier circuit is connected to a secondary side of the transformer, and the rectifier circuit is configured to rectify a current output by the transformer.

In FIG. 17, the series circuit formed after the auxiliary power transistor $Q_2$ and the first capacitor $C_1$ are connected in series is connected to the transformer in parallel, connection terminals of the first capacitor $C_1$ and the transformer are connected to the negative electrode, the drain of the main power transistor $Q_1$ is connected to the positive electrode, and the source of the main power transistor $Q_1$ is connected to the drain of the auxiliary power transistor $Q_2$. The transformer includes a primary-side winding and a secondary-side winding, and a dotted terminal of the primary-side winding is connected to the positive electrode. Alternatively, the transformer includes a primary-side winding and a secondary-side winding, a dotted terminal of the primary-side winding is connected to the drain of the auxiliary power transistor $Q_2$, and a dotted terminal of the secondary-side winding is grounded. FIG. 17 further shows a rectifier circuit. The rectifier circuit is connected to the secondary side of the transformer, and the rectifier circuit is configured to rectify a current output by the transformer.

In this application, in addition to being applied to the power adapter, the converter provided in the foregoing embodiment may be applied to another product, for example, a vehicle-mounted power supply, a base station power supply, or another product related to direct current-direct current switching control.

The foregoing descriptions are merely specific implementations of embodiments of this application, but the protection scope of embodiments of this application is not limited thereto.

The invention claimed is:

1. A converter, comprising:
a direct current power supply;
a main power transistor;
an auxiliary power transistor
a first capacitor
a transformer
a control circuit; and
wherein:
the first capacitor and the transformer are connected in series to form a series circuit, the series circuit is connected to a first terminal and a second terminal of the auxiliary power transistor in parallel, a first terminal of the main power transistor is connected to the second terminal of the auxiliary power transistor, a second terminal of the main power transistor is connected to one of a positive electrode or a negative electrode of the direct current power supply, the first terminal of the auxiliary power transistor is connected to the other electrode of the direct current power supply, and the negative electrode is grounded; and
the control circuit is configured to:
when the main power transistor is in a cutoff state and a target voltage reaches a target valley voltage, control the main power transistor to be conducted, wherein the target voltage is a voltage between the first terminal of the main power transistor and the ground, and the target valley voltage is a voltage of at least one waveform valley in the target voltage when the converter operates;
detect an excitation current in the transformer when the excitation current in the transformer is discontinuous and the auxiliary power transistor is conducted; and
when the excitation current is equal to 0, control the auxiliary power transistor to be cut off.

2. The converter according to claim 1, wherein the control circuit is configured to:
detect the target voltage when the main power transistor is in the cutoff state;
determine, based on a preset policy, whether the target voltage reaches the target valley voltage;
if the target voltage reaches the target valley voltage, control the main power transistor to be conducted; and
after the main power transistor is cut off and a dead time period passes, control the auxiliary power transistor to be conducted, wherein the dead time period is a time period in which the main power transistor is cut off and the auxiliary power transistor is not conducted.

3. The converter according to claim 1, wherein the control circuit is further configured to:
determine a comparison result between the target voltage and a preset voltage threshold, and
adjust conduction duration of the auxiliary power transistor based on the comparison result.

4. The converter according to claim 3, wherein the second terminal of the main power transistor is connected to the negative electrode, and the first terminal of the auxiliary power transistor is connected to the positive electrode; and
the control circuit is further configured to: lengthen next conduction duration of the auxiliary power transistor based on current conduction duration of the auxiliary power transistor when the comparison result indicates that the target voltage is greater than the preset voltage threshold; or shorten next conduction duration of the auxiliary power transistor based on current conduction duration of the auxiliary power transistor when the comparison result indicates that the target voltage is less than the preset voltage threshold.

5. The converter according to claim 3, wherein the second terminal of the main power transistor is connected to the positive electrode, and the first terminal of the auxiliary power transistor is connected to the negative electrode; and
the control circuit is further configured to:
shorten next conduction duration of the auxiliary power transistor based on current conduction duration of the auxiliary power transistor when the comparison result indicates that the target voltage is greater than the preset voltage threshold; or
lengthen next conduction duration of the auxiliary power transistor based on current conduction duration of the auxiliary power transistor when the comparison result indicates that the target voltage is less than the preset voltage threshold.

6. The converter according to claim 3, wherein
the control circuit is further configured to: repeatedly adjust the conduction duration of the auxiliary power transistor based on an adaptive policy, and adjust the target voltage to the preset voltage threshold when the target voltage reaches a first valley voltage in an operating waveform of the target voltage.

7. The converter according to claim 1, wherein when the converter operates, an operating waveform of the excitation current in the transformer comprises at least one of a continuous waveform or a discontinuous waveform;
if the operating waveform of the excitation current is a continuous waveform when the target voltage reaches the first valley voltage, the control circuit controls, when the target voltage reaches the first valley voltage, the main power transistor to be conducted; and
if the operating waveform of the excitation current is a discontinuous waveform when the target voltage reaches the first valley voltage, the control circuit maintains the main power transistor in the cutoff state, and when the target voltage reaches an $m^{th}$ valley voltage, controls the main power transistor to be conducted, wherein m is an integer greater than 1.

8. The converter according to claim 1, wherein the control circuit comprises a detection circuit, a power transistor control circuit, a first drive circuit, and a second drive circuit, wherein the power transistor control circuit is separately connected to the detection circuit, the first drive circuit, and the second drive circuit; the first drive circuit is connected to the main power transistor; and the second drive circuit is connected to the auxiliary power transistor;

the detection circuit is configured to detect the target voltage;

the power transistor control circuit is configured to send a drive signal for the first drive circuit or the second drive circuit based on a detection result of the detection circuit;

the first drive circuit is configured to drive, based on the drive signal, the main power transistor to be conducted or cut off; and the second drive circuit is configured to drive, based on the drive signal, the auxiliary power transistor to be conducted or cut off.

9. The converter according to claim 1, wherein the converter further comprises a second capacitor, and two terminals of the second capacitor are respectively connected to the positive electrode and the negative electrode.

10. The converter according to claim 1, wherein the transformer comprises a primary-side winding and a secondary-side winding, a dotted terminal of the primary-side winding is connected to the first capacitor, and a dotted terminal of the secondary-side winding is grounded.

11. The converter according to claim 1 wherein the transformer comprises a primary-side winding and a secondary-side winding, a dotted terminal of the primary-side winding is connected to the first capacitor, and a dotted terminal of the secondary-side winding is connected to a secondary-side synchronous rectifier.

12. A converter, comprising:
a direct current power supply;
a main power transistor;
an auxiliary power transistor;
a first capacitor;
a transformer;
a control circuit;
wherein:

the first capacitor and the auxiliary power transistor are connected in series to form a series circuit, the series circuit is connected to two terminals of the transformer in parallel, a first terminal of the main power transistor is connected to a second terminal of the auxiliary power transistor, a second terminal of the main power transistor is connected to one of a positive electrode or a negative electrode of the direct current power supply, one terminal that is of the first capacitor and that is connected to the transformer is connected to the other electrode of the direct current power supply, and the negative electrode is grounded; and the control circuit is configured to:

when the main power transistor is in a cutoff state and a target voltage reaches a target valley voltage, control the main power transistor to be conducted, wherein the target voltage is a voltage between the first terminal of the main power transistor and the ground, and the target valley voltage is a voltage of at least one waveform valley in the target voltage when the converter operates;

detect an excitation current in the transformer when the excitation current in the transformer is discontinuous and the auxiliary power transistor is conducted; and control the auxiliary power transistor to be cut off when the excitation current is equal to 0.

13. The converter according to claim 12, wherein the transformer comprises a primary-side winding and a secondary-side winding, a dotted terminal of the primary-side winding is connected to the positive electrode or the first terminal of the main power transistor, and a dotted terminal of the secondary-side winding is grounded.

14. A power adapter, comprising:
a converter,
an alternating current-direct current conversion circuit,
a filter circuit,
wherein:

the filter circuit is separately connected to the alternating current-direct current conversion circuit and the converter;

the alternating current-direct current conversion circuit is configured to convert an alternating current in a power grid into a direct current;

the converter is configured to supply a direct current voltage to a load, wherein the converter comprises a direct current power supply, a main power transistor, an auxiliary power transistor, a first capacitor, a transformer, and a control circuit, the first capacitor and the transformer are connected in series to form a series circuit, the series circuit is connected to a first terminal and a second terminal of the auxiliary power transistor in parallel, a first terminal of the main power transistor is connected to the second terminal of the auxiliary power transistor, a second terminal of the main power transistor is connected to one of a positive electrode or a negative electrode of the direct current power supply, the first terminal of the auxiliary power transistor is connected to the other electrode of the direct current power supply, and the negative electrode is grounded; and the control circuit is configured to:

when the main power transistor is in a cutoff state and a target voltage reaches a target valley voltage, control the main power transistor to be conducted, wherein the target voltage is a voltage between the first terminal of the main power transistor and the ground, and the target valley voltage is a voltage of at least one waveform valley in the target voltage when the converter operates;

the filter circuit is configured to filter out noise in the alternating current-direct current conversion circuit and the converter;

detect an excitation current in the transformer when the excitation current in the transformer is discontinuous and the auxiliary power transistor is conducted; and control the auxiliary power transistor to be cut off when the excitation current is equal to 0.

15. The converter according to claim 14, wherein the control circuit is configured to: detect the target voltage when the main power transistor is in the cutoff state; determine, based on a preset policy, whether the target voltage reaches the target valley voltage; if the target voltage reaches the target valley voltage, control the main power transistor to be conducted; and after the main power transistor is cut off and a dead time period passes, control the auxiliary power transistor to be conducted, wherein the dead time period is a time period in which the main power transistor is cut off and the auxiliary power transistor is not conducted.

16. The converter according to claim 14, wherein the control circuit is further configured to: determine a comparison result between the target voltage and a preset voltage threshold, and adjust conduction duration of the auxiliary power transistor based on the comparison result.

17. The converter according to claim 16, wherein the second terminal of the main power transistor is connected to the negative electrode, and the first terminal of the auxiliary power transistor is connected to the positive electrode; and
the control circuit is configured to:
lengthen next conduction duration of the auxiliary power transistor based on current conduction duration of the auxiliary power transistor when the comparison result indicates that the target voltage is greater than the preset voltage threshold; or
shorten next conduction duration of the auxiliary power transistor based on current conduction duration of the auxiliary power transistor when the comparison result indicates that the target voltage is less than the preset voltage threshold.

18. The converter according to claim 16, wherein the second terminal of the main power transistor is connected to the positive electrode, and the first terminal of the auxiliary power transistor is connected to the negative electrode; and
the control circuit is configured to: shorten next conduction duration of the auxiliary power transistor based on current conduction duration of the auxiliary power transistor when the comparison result indicates that the target voltage is greater than the preset voltage threshold; or lengthen next conduction duration of the auxiliary power transistor based on current conduction duration of the auxiliary power transistor when the comparison result indicates that the target voltage is less than the preset voltage threshold.

19. The converter according to claim 16, wherein
the control circuit is configured to: repeatedly adjust the conduction duration of the auxiliary power transistor based on an adaptive policy, and adjust the target voltage to the preset voltage threshold when the target voltage reaches a first valley voltage in an operating waveform of the target voltage.

\* \* \* \* \*